United States Patent
Ohshio et al.

(10) Patent No.: US 10,677,373 B2
(45) Date of Patent: Jun. 9, 2020

(54) SERVO-VALVE AND FLUIDIC DEVICE

(71) Applicant: NABTESCO CORPORATION, Tokyo (JP)

(72) Inventors: Keitaroh Ohshio, Gifu-ken (JP); Yu Shibata, Gifu-ken (JP); Satoshi Asada, Gifu-ken (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/229,139

(22) Filed: Dec. 21, 2018

(65) Prior Publication Data

US 2019/0120405 A1    Apr. 25, 2019

Related U.S. Application Data

(63) Continuation of application No. 15/633,460, filed on Jun. 26, 2017, now abandoned.

(30) Foreign Application Priority Data

Jun. 27, 2016   (JP) .................................. 2016-126964
Jun. 5, 2017    (JP) .................................. 2017-111225

(51) Int. Cl.
  *F16K 31/04*      (2006.01)
  *F16K 31/42*      (2006.01)
  (Continued)

(52) U.S. Cl.
  CPC ........ *F16K 31/423* (2013.01); *F15B 13/0436* (2013.01); *F16K 11/072* (2013.01)

(58) Field of Classification Search
  CPC ... F16K 31/423; F16K 11/072; F15B 13/0436
  (Continued)

(56) References Cited

U.S. PATENT DOCUMENTS 2,111,466 A    3/1938  Wunsch
2,273,600 A    2/1942  Specht
(Continued)

FOREIGN PATENT DOCUMENTS

DE    3737143 A1    5/1989

OTHER PUBLICATIONS

Extended European Search Report corresponding to Application No. 17177983.8-1754; dated Nov. 20, 2017.
(Continued)

*Primary Examiner* — Minh Q Le
(74) *Attorney, Agent, or Firm* — Cantor Colburn LLP

(57) ABSTRACT

The disclosure discloses a servo-valve that controls a fluid discharged from a discharge port of a nozzle by displacing the nozzle and drives an actuator. The servo-valve includes a receiver that includes an inflow surface provided with a first inflow port and a second inflow port into which the fluid discharged from the discharge port flows. The nozzle includes a force generation portion that includes an end surface provided with the discharge port and an outer circumferential surface formed in the periphery of the end surface. When the nozzle is displaced from a neutral position toward the first inflow port, the fluid inside the second inflow port is blown out toward the nozzle. The force generation portion collides with the fluid blown out from the second inflow port and causes an assisting force in a direction matching a nozzle displacement direction toward the first inflow port. The nozzle easily moves by the assisting force generated in the force generation portion and thus a response speed is improved.

13 Claims, 13 Drawing Sheets

(51) Int. Cl.
*F15B 13/043* (2006.01)
*F16K 11/072* (2006.01)

(58) Field of Classification Search
USPC ....... 137/487.5, 83, 85, 438, 565.14, 625.64
See application file for complete search history.

(56) References Cited

U.S. PATENT DOCUMENTS

| | | | |
|---|---|---|---|
| 2,308,662 | A | 1/1943 | Von Manteuffel |
| 2,377,300 | A | 5/1945 | Pray |
| 2,498,284 | A | 2/1950 | Leonard |
| 2,726,671 | A | 12/1955 | Zand et al. |
| 2,814,487 | A | 11/1957 | Medkeff |
| 2,884,907 | A | 5/1959 | Atchley |
| 3,011,505 | A | 12/1961 | Reip |
| 3,282,283 | A | 11/1966 | Takeda |
| 3,290,997 | A | 12/1966 | Jerome et al. |
| 3,331,383 | A | 7/1967 | Buchanan |
| 3,386,343 | A | 6/1968 | Gray |
| 3,678,951 | A | 7/1972 | Coakley |
| 3,835,888 | A | 9/1974 | Leutner et al. |

OTHER PUBLICATIONS

USPTO Non-Final Office Action corresponding to U.S. Appl. No. 15/633,460; dated Apr. 6, 2018.
USPTO Notice of Allowance corresponding to U.S. Appl. No. 15/633,460; dated Sep. 26, 2018.
European Office Action corresponding to Application No. 17177983.8-1010; dated Jul. 24, 2019.

(NEUTRAL POSITION)

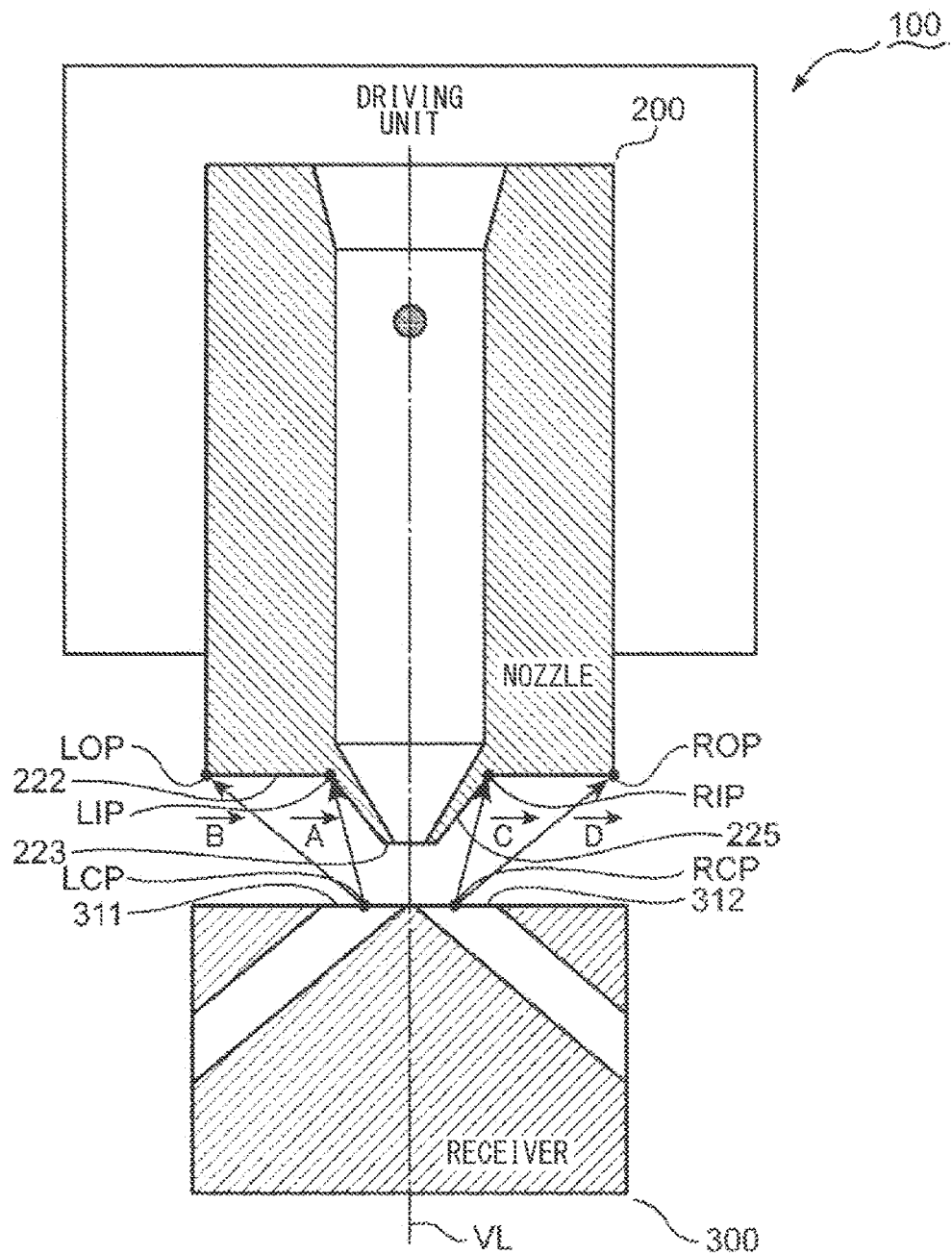

SERVO-VALVE AND FLUIDIC DEVICE

CROSS-REFERENCE TO RELATED APPLICATIONS

This application is a continuation under 35 U.S.C. § 120 of U.S. patent application Ser. No. 15/633,460, filed on Jun. 26, 2017. U.S. patent application Ser. No. 15/633,460, claims the priority to Japanese Application No. 2017-111225, filed Jun. 5, 2017 and Japanese Application No. 2016-126964, filed Jun. 27, 2016, the entire contents of which are also incorporated herein by reference.

BACKGROUND OF THE INVENTION

1. Field of the Invention

The present invention relates to a servo-valve and a fluidic device having a high response performance.

2. Description of the Related Art

A servo-valve is used in airplanes or other industrial fields. U.S. Pat. No. 2,884,907 discloses a technique of displacing a nozzle toward left and right sides of a rotation axis based on an electromagnetic principle to adjust the amount of hydraulic oil flowing into two inflow ports formed in a receiver.

A high response speed of the servo-valve results in a high accuracy of a control using the servo-valve. Thus, there have been various attempts for improving a mechanical mechanism and/or an electrical mechanism for driving the nozzle from the past. However, many of these improvements face various problems involving with a selection of a material, a mechanical strength, a complex control, and a manufacturing cost of the servo-valve.

SUMMARY OF THE INVENTION

An object of the invention is to provide a simple technique of giving a high response speed to a servo-valve.

A servo-valve according to an aspect of the invention controls a fluid discharged from a discharge port of a nozzle by displacing the nozzle and drives an actuator. The servo-valve includes a receiver that includes an inflow surface provided with a first inflow port and a second inflow port into which the fluid discharged from the discharge port flows. The nozzle includes a force generation portion that includes an end surface provided with the discharge port and an outer circumferential surface formed in the periphery of the end surface. When the nozzle is displaced from a neutral position in which an extended line extended from a center of the discharge port intersects the inflow surface between the first inflow port and the second inflow port toward a position in which the extended line intersects the first inflow port, the fluid inside the second inflow port is blown out toward the nozzle. The force generation portion collides with the fluid blown out from the second inflow port and causes an assisting force in a direction matching the nozzle displacement direction.

According to the above-described configuration, since the force generation portion collides with the fluid blown out from the second inflow port and causes an assisting force in a direction matching the nozzle displacement direction, the displacement of the nozzle is assisted by a first assisting force. Since the nozzle can be quickly displaced toward the first inflow port under the action of the assisting force, the servo-valve can quickly drive the actuator.

A fluidic device according to another aspect of the invention includes the above-described servo-valve and an actuator that includes a second movable piece operated in response to the displacement of a first movable piece.

According to the above-described configuration, since the fluidic device includes the above-described servo-valve, the nozzle is highly responsively operated. As a result, the first movable piece can be also highly responsively displaced. Since the second movable piece of the actuator is operated in response to the displacement of the first movable piece, the second movable piece can be also highly responsively operated.

A fluidic device according to still another aspect of the invention includes the above-described servo-valve and an actuator that includes the casing and a movable piece dividing a hollow portion formed by the casing to form the flow path. When the nozzle is displaced toward the first inflow port, the movable piece is displaced by the fluid discharged to the first inflow port and extrudes the fluid from the second outflow port to blow out the fluid from the second inflow port. When the nozzle is displaced toward the second inflow port, the movable piece is displaced by the fluid discharged to the second inflow port and extrudes the fluid from the first outflow port to blow out the fluid from the first inflow port.

According to the above-described configuration, since the movable piece is displaced by the fluid discharged to the first inflow port and blows out the fluid from the second inflow port when the nozzle is displaced toward the first inflow port, the displacement of the nozzle toward the first inflow port is assisted by the fluid blown out from the second inflow port. Since the movable piece is displaced by the fluid discharged to the second inflow port and blows out the fluid from the first inflow port when the nozzle is displaced toward the second inflow port, the displacement of the nozzle toward the second inflow port is assisted by the fluid blown out from the first inflow port.

BRIEF DESCRIPTION OF THE DRAWINGS

FIG. 7 is a conceptual diagram showing the servo-valve shown in FIG. 1 (fifth embodiment).

DETAILED DESCRIPTION OF THE INVENTION

The invention will now be described by reference to the preferred embodiments. This does not intend to limit the scope of the present invention, but to exemplify the invention.

First Embodiment

A servo-valve generally includes a receiver and a nozzle. The receiver is provided with a pair of inflow ports into which a hydraulic fluid (which is, for example, hydraulic oil and will be simply referred to as a "fluid" while the invention is not limited to the hydraulic oil) discharged from the nozzle flows. While the hydraulic fluid discharged from the nozzle mainly flows into one inflow port, the hydraulic fluid extruded by the spool valve or the actuator is discharged from the other inflow port. The inventors have developed a technique of improving the response performance of the servo-valve by using the hydraulic fluid extruded by the spool valve or the actuator. In the first embodiment, an illustrative servo-valve having a satisfactory response will be described.

Figure 1:
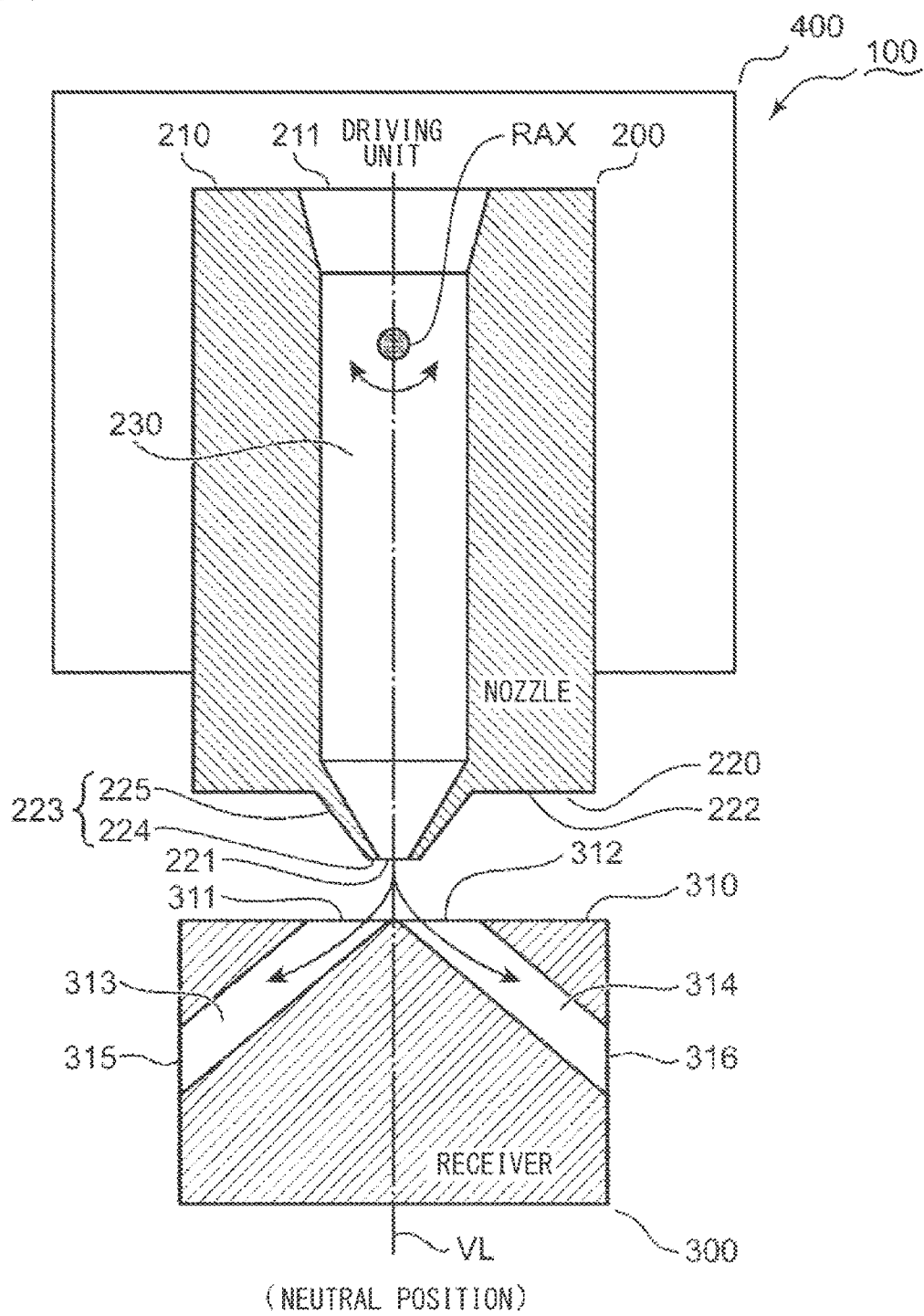
FIG. 1 is a conceptual diagram showing a servo-valve according to a first embodiment.

FIG. 1 is a conceptual diagram showing a servo-valve 100 of a first embodiment. The servo-valve 100 will be described with reference to FIG. 1. Terms like "upward", "downward", "leftward", "rightward", "clockwise", "counterclockwise", "vertical", and "horizontal" indicating directions are used merely for the purpose of making the explanation unambiguous. The principle of the embodiments is not by any means limited by these terms denoting the directions.

The servo-valve 100 includes a nozzle 200, a receiver 300, and a driving unit 400. The driving unit 400 turns (swings) (hereinafter, referred to as "oscillation movement" or "oscillation") a front end of the nozzle 200 in both directions (clockwise and counterclockwise) within a predetermined angle range about a rotation axis RAX defined at an upper portion of the nozzle 200. The driving unit 400 may be a general torque motor which gives a rotational force (a turning force) to the nozzle 200 using an electromagnetic force or other driving devices which turns (swings) the front end of the nozzle 200 in both directions within a predetermined angle range about a rotation axis. The principle of the embodiment is not limited to a specific device used as the driving unit 400.

The nozzle 200 includes an upper surface 210 and a lower surface 220. The lower surface 220 faces the receiver 300. The upper surface 210 is located above the lower surface 220. The upper surface 210 is provided with an inflow port 211. The inflow port 211 is connected to a pump or other fluid supply sources supplying a hydraulic fluid. The hydraulic fluid (which will be referred to as, for example, hydraulic oil, but may be simply referred to as a "fluid" on the condition that the invention is not limited thereto) flows into the nozzle 200 through the inflow port 211.

The lower surface 220 (the front end surface) is provided with a discharge port 221. The nozzle 200 is provided with a nozzle flow path 230 which extends downward from the inflow port 211 and is coupled to the discharge port 221. The nozzle flow path 230 becomes narrow toward the discharge port 221. The hydraulic fluid which flows from the inflow port 211 into the nozzle 200 flows downward along the nozzle flow path 230 and is discharged from the discharge port 221. Subsequently, the hydraulic fluid flows into the receiver 300.

The receiver 300 includes an upper surface (an opposite surface) 310 which faces the lower surface 220 of the nozzle 200. The upper surface 310 is provided with a left inflow port 311 and a right inflow port 312. Each of the left inflow port 311 and the right inflow port 312 is formed to be larger than the discharge port 221. The receiver 300 is provided with a left flow path 313 and a right flow path 314. The left flow path 313 extends leftward and downward from the left inflow port 311 and is terminated at the left outflow port 315. The right flow path 314 extends rightward and downward from the right inflow port 312 and is terminated at the right outflow port 316. The left outflow port 315 and the right outflow port 316 are formed in an outer surface of the receiver 300 and are coupled to a spool valve (not shown) or an actuator (not shown).

The nozzle 200 shown in FIG. 1 is positioned at the neutral position. When the nozzle 200 is positioned at the neutral position, the center axis of the nozzle flow path 230 (the axis line connecting the center of the inflow port 211 and the center of the discharge port 221) substantially matches the vertical line VL passing through a midpoint of a line extended between the center of the left inflow port 311 and the center of the right inflow port 312. When the nozzle 200 is positioned at the neutral position, the hydraulic fluid discharged from the discharge port 221 flows in substantially in the same quantity into the left inflow port 311 and the right inflow port 312. In the embodiment, the first inflow port is exemplified by one of the left inflow port 311 and the right inflow port 312. The second inflow port is exemplified by the other of the left inflow port 311 and the right inflow port 312. The inflow surface is exemplified by the upper surface 310 of the receiver 300.

Figure 2A:
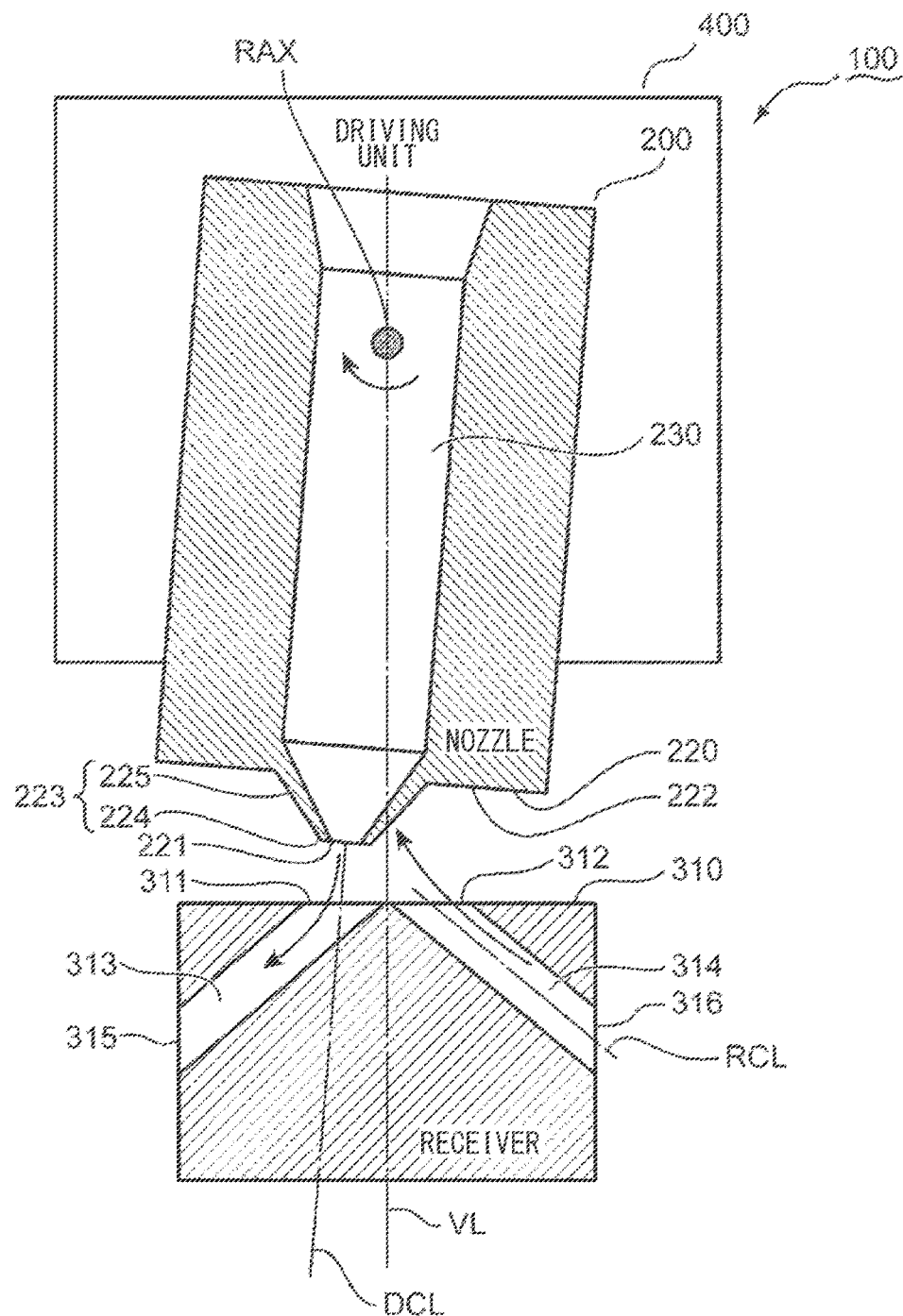
FIG. 2A is a conceptual diagram showing the servo-valve shown in FIG. 1.
Figure 2B:
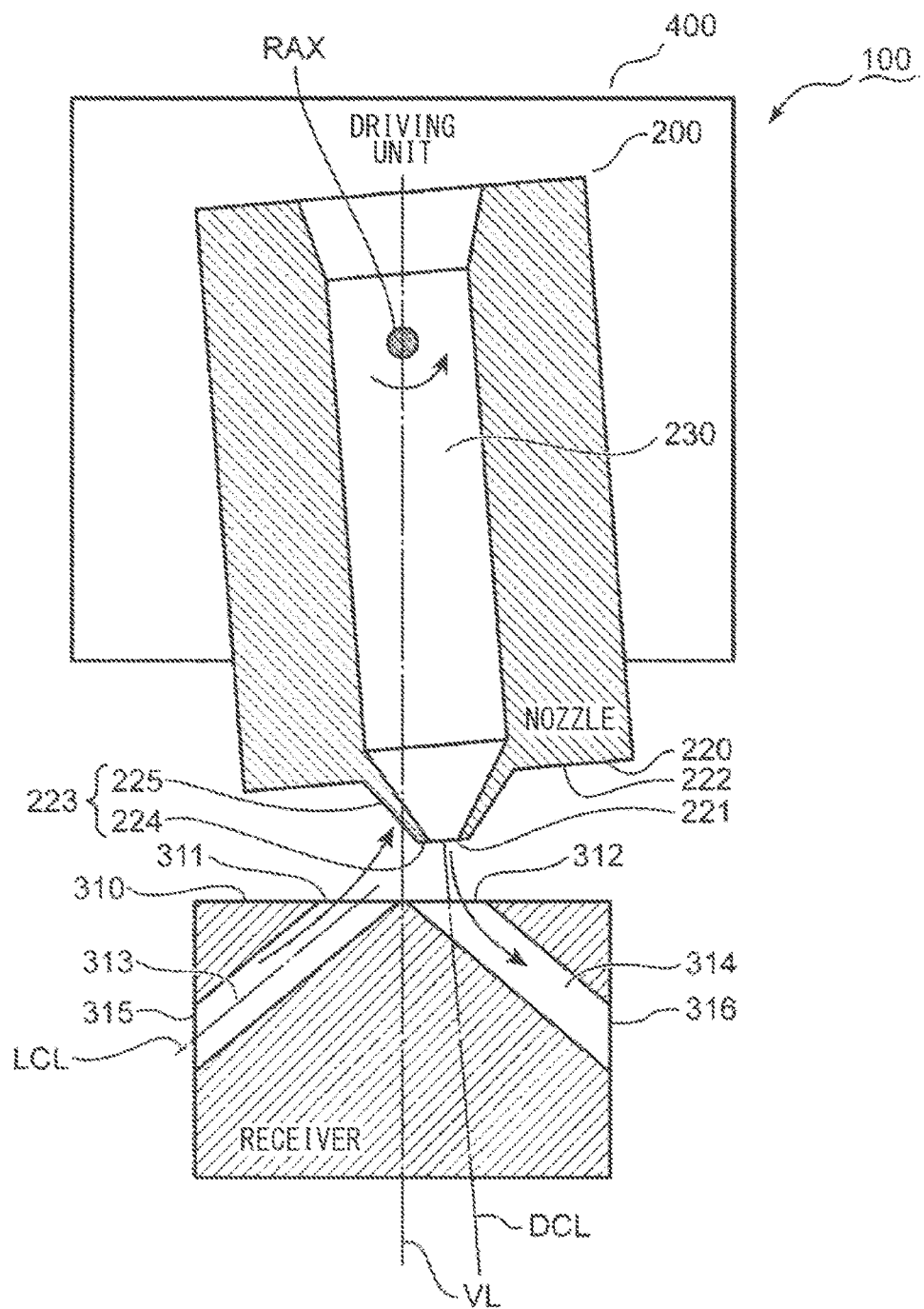
FIG. 2B is a conceptual diagram showing the servo-valve shown in FIG. 1.

FIG. 2A and FIG. 2B are conceptual diagrams of the servo-valve 100. Referring to FIG. 1 to FIG. 2B, the servo-valve 100 will be further described.

The nozzle 200 shown in FIG. 2A is oscillated clockwise about the rotation axis RAX from the neutral position (the position of the nozzle 200 shown in FIG. 1) by the driving unit 400. At this time, the discharge port 221 is positioned to the left of the vertical line VL.

The nozzle 200 shown in FIG. 2B is oscillated counterclockwise about the rotation axis RAX from the neutral position (the position of the nozzle 200 shown in FIG. 1) by the driving unit 400. At this time, the discharge port 221 is positioned to the right of the vertical line VL.

FIG. 2A and FIG. 2B respectively show the discharge line DCL extended from the center of the discharge port 221 toward the receiver 300 in the extension direction of the center axis of the nozzle flow path 230. The hydraulic fluid is discharged from the discharge port 221 along the discharge line DCL. When the nozzle 200 is oscillated clockwise by the driving unit 400, the discharge line DCL intersects the left inflow port 311. When the nozzle 200 is oscillated counterclockwise by the driving unit 400, the discharge line DCL intersects the right inflow port 312. In the embodiment, the extended line is exemplified by the discharge line DCL. The first position is exemplified by the position of the nozzle 200 shown in one of FIG. 2A and FIG. 2B. The second position is exemplified by the position of the nozzle 200 shown in the other of FIG. 2A and FIG. 2B.

The lower surface 220 of the nozzle 200 includes a facing surface 222 which faces the upper surface 310 of the receiver 300 and a protruding surface 223 that protrudes downward from the facing surface 222. When the nozzle 200 is positioned at the neutral position (see FIG. 1), the facing surface 222 is substantially parallel to the upper surface 310 of the receiver 300. The protruding surface 223 forms a projection protruding from the facing surface 222. In the embodiment, the protruding surface 223 forms a truncated cone which corresponds to a projection and grows narrower toward the upper surface 310 of the receiver 300. Alternatively, the protruding surface 223 may be configured as a projection to form another three-dimensional shape (for example, truncated pyramid or dome). The principle of the embodiment is not limited to a specific three-dimensional shape formed by the protruding surface 223. In the embodiment, a force generation portion is exemplified by the protruding surface 223. That is, the force generation portion is formed by a surface which is formed in a direction generating a force of assisting the displacement of the nozzle 200 by the fluid returning from the receiver 300.

The protruding surface 223 includes an end surface 224 and a circumferential surface 225. The discharge port 221 is formed in the end surface 224. The circumferential surface 225 is an annular band surface formed between the end surface 224 and the facing surface 222 and forms an outer circumferential surface having a truncated cone form and formed by the protruding surface 223.

FIG. 2A shows the center line RCL of the right flow path 314. The center line RCL intersects the right half of the circumferential surface 225.

The hydraulic fluid discharged from the nozzle 200 shown in FIG. 2A mainly flows into the left inflow port 311. Subsequently, the hydraulic fluid is supplied to a movable portion (not shown) such as a spool valve (not shown) or an actuator (not shown) through the left flow path 313. The movable portion performs a predetermined operation by the hydraulic fluid supplied through the left flow path 313. All this while, the movable portion extrudes the hydraulic fluid existing in a flow path (not shown) connected to the right flow path 314 from the movable portion. As a result, the hydraulic fluid is blown out from the right inflow port 312 to the extension direction (the left obliquely upward direction) of the center line RCL. Thus, the hydraulic fluid blown out from the right inflow port 312 collides with the right half of the circumferential surface 225. The collision between the hydraulic fluid and the right half of the circumferential surface 225 results in an assisting force of assisting the clockwise oscillation of the nozzle 200. In the embodiment, one of the first assisting force and the second assisting force is exemplified by the assisting force produced by the collision between the hydraulic fluid and the right half of the circumferential surface 225. One of the first force generation surface and the second force generation surface is exemplified by the right half of the circumferential surface 225.

FIG. 2B shows the center line LCL of the left flow path 313. The center line LCL intersects the left half of the circumferential surface 225.

The hydraulic fluid discharged from the nozzle 200 shown in FIG. 2B mainly flows into the right inflow port 312. Subsequently, the hydraulic fluid is supplied to a movable portion (not shown) such as a spool valve (not shown) or an actuator (not shown) through the right flow path 314. The movable portion performs a predetermined operation by the hydraulic fluid supplied through the right flow path 314. All this while, the movable portion extrudes the hydraulic fluid existing in a flow path (not shown) connected to the left flow path 313 from the movable portion. As a result, the hydraulic fluid is blown out from the left inflow port 311 to the extension direction (the right obliquely upward direction) of the center line LCL. Thus, the hydraulic fluid blown out from the left inflow port 311 collides with the left half of the circumferential surface 225. The collision between the hydraulic fluid and the left half of the circumferential surface 225 results in an assisting force of assisting the counterclockwise oscillation of the nozzle 200. In the embodiment, the other of the first assisting force and the second assisting force is exemplified by an assisting force produced by the collision between the hydraulic fluid and the left half of the circumferential surface 225. The other of the first force generation surface and the second force generation surface is exemplified by the left half of the circumferential surface 225.

Second Embodiment

If the servo-valve can obtain the assisting force from the hydraulic fluid blown out from the receiver immediately after the movement from the neutral position, the response performance of the servo-valve is further improved. In a second embodiment, an illustrative servo-valve which is designed to obtain the assisting force from the hydraulic fluid blown out from the receiver immediately after the movement from the neutral position will be described.

Figure 3:
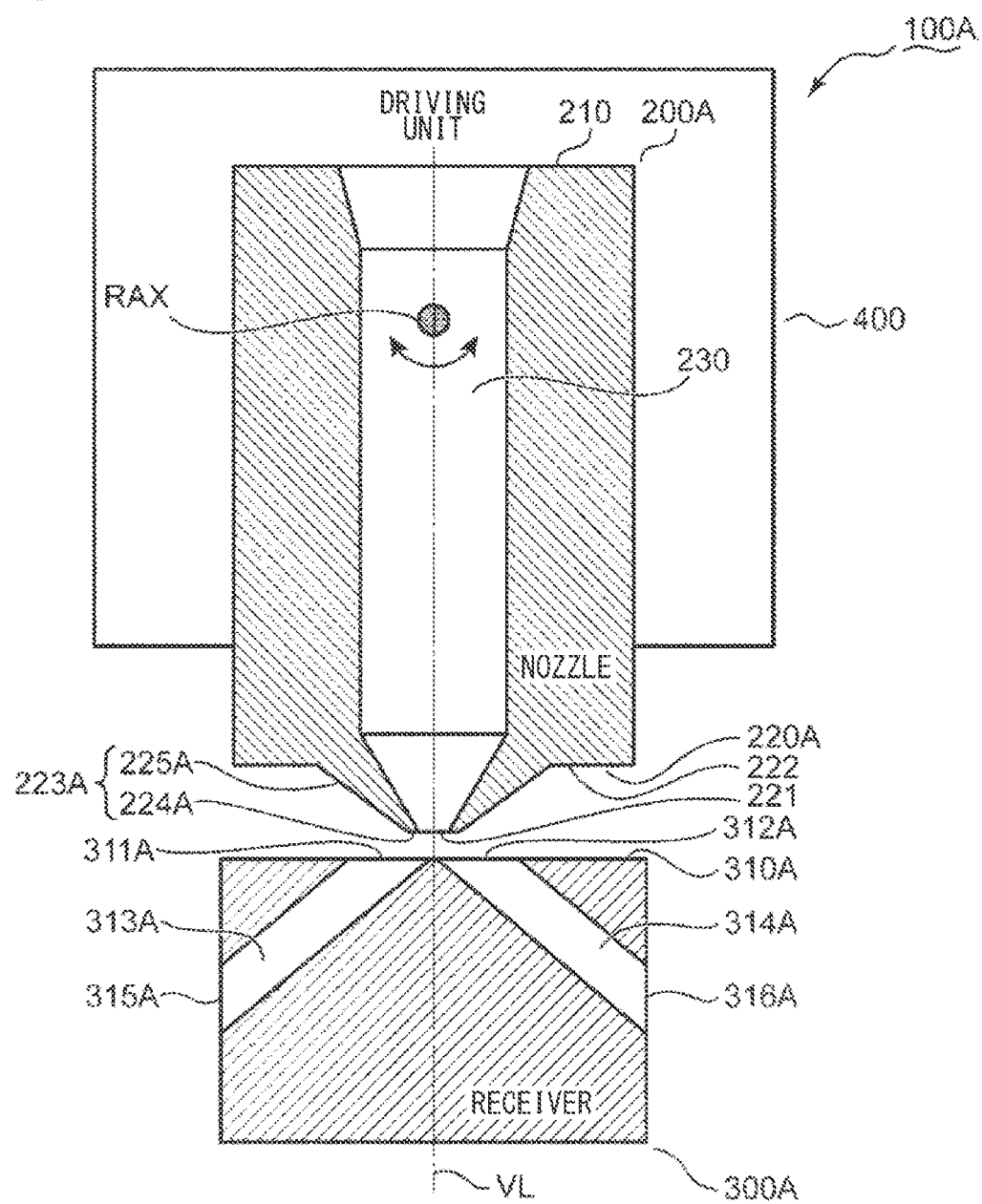
FIG. 3 is a conceptual diagram showing a servo-valve according to a second embodiment.

FIG. 3 is a conceptual diagram showing a servo-valve 100A of the second embodiment. Referring to FIG. 3, the servo-valve 100A will be described. The explanation of the first embodiment is incorporated in the description of the elements denoted by the same reference numerals as those of the first embodiment. In the embodiment, terms like "upward", "downward", "leftward", "rightward", "clockwise", "counterclockwise", "vertical", and "horizontal" indicating directions are used merely for the purpose of making the explanation unambiguous. The principle of the embodiments is not by any means limited by these terms denoting the directions.

Like the first embodiment, the servo-valve 100A includes a driving unit 400. The explanation of the first embodiment is incorporated in the description of the driving unit 400.

The servo-valve 100A further includes a nozzle 200A and a receiver 300A. Like the first embodiment, the nozzle 200A includes the upper surface 210. Like the first embodiment, the nozzle flow path 230 is formed inside the nozzle 200A. The explanation of the first embodiment is incorporated in the description of the upper surface 210 and the nozzle flow path 230.

The nozzle 200A further includes a lower surface 220A. Like the first embodiment, the lower surface 220A includes the facing surface 222. The explanation of the first embodiment is incorporated in the description of the facing surface 222.

The nozzle 200A further includes a protruding surface 223A that protrudes downward from the facing surface 222. The protruding surface 223A forms a projection which protrudes from the facing surface 222. In the embodiment, the protruding surface 223A forms a projection which is formed in a truncated cone form and grows narrower toward an upper surface 310A of the receiver 300A. Alternatively, the protruding surface 223A may be provided with a projection having a different three-dimensional shape (for example, a truncated pyramid or a dome). The principle of the embodiment is not limited to a specific three-dimensional shape formed by the protruding surface 223A. In the embodiment, the force generation portion is exemplified by the protruding surface 223A.

The protruding surface 223A includes an end surface 224A and a circumferential surface 225A. The discharge port 221 described in the first embodiment is formed in the end surface 224A. The circumferential surface 225A is an annular band surface which is formed between the end surface 224A and the facing surface 222 and forms an outer circumferential surface having a truncated cone form and formed by the protruding surface 223A.

The receiver 300A includes an upper surface 310A which faces the lower surface 220A of the nozzle 200A. The upper surface 310A is provided with a left inflow port 311A and a right inflow port 312A. Each of the left inflow port 311A and the right inflow port 312A may be formed to be larger than the discharge port 221. The receiver 300A is provided with a left flow path 313A and a right flow path 314A. The left flow path 313A extends leftward and downward from the left inflow port 311A and is terminated at the left outflow port 315A. The right flow path 314A extends rightward and downward from the right inflow port 312A and is terminated at the right outflow port 316A. The left outflow port 315A and the right outflow port 316A are formed in the outer surface of the receiver 300A and are coupled to the spool valve (not shown) or the actuator (not shown).

The nozzle 200A shown in FIG. 3 is positioned at the neutral position. The left inflow port 311A of the receiver 300 faces a wide area of the left half of the circumferential surface 225A of the nozzle 200A at the neutral position. Thus, the nozzle 200A can receive the assisting force of assisting the counterclockwise oscillation from the hydraulic fluid blown out from the left inflow port 311A almost simultaneously with the start of the counterclockwise oscillation of the nozzle 200A. This means that the nozzle 200A can be highly responsively oscillated counterclockwise. The right inflow port 312A of the receiver 300 faces a wide area of the right half of the circumferential surface 225A of the nozzle 200A at the neutral position. Thus, the nozzle 200A can receive the assisting force of assisting the clockwise oscillation from the hydraulic fluid blown out from the right inflow port 312A almost simultaneously with the start of the clockwise oscillation of the nozzle 200A. This means that the nozzle 200A can be highly responsively oscillated clockwise.

In the embodiment, the first force generation surface is exemplified by the left half or the right half of the circumferential surface 225A of the nozzle 200A. The second force generation surface is exemplified by the right half or the left half of the circumferential surface 225A of the nozzle 200A. The first inflow port is exemplified by the right inflow port 312A or the left inflow port 311A. The second inflow port is exemplified by the left inflow port 311A or the right inflow port 312A.

In order to obtain the above-described positional relation among the left inflow port 311A, the right inflow port 312A, and the circumferential surface 225A, the designer can adjust, for example, the following dimensions.

(1) Distance between facing surface 222 and end surface 224A (2) Size of end surface 224A (3) Inclination angle between vertical line VL and generation line of circumferential surface 225A (that is, taper angle of truncated cone formed by protruding surface 223)

(4) Distance between centers of left inflow port 311A and right inflow port 312A (5) Shapes and sizes of left inflow port 311A and right inflow port 312A (6) Inclination angles of left flow path 313A and right flow path 314A with respect to vertical line VL Third Embodiment The protruding surface of the nozzle described in the above-described embodiments forms a truncated conical projection. However, the projection may have various different forms. In a third embodiment, an illustrative three-dimensional shape formed by the protruding surface will be described.

Figure 4:
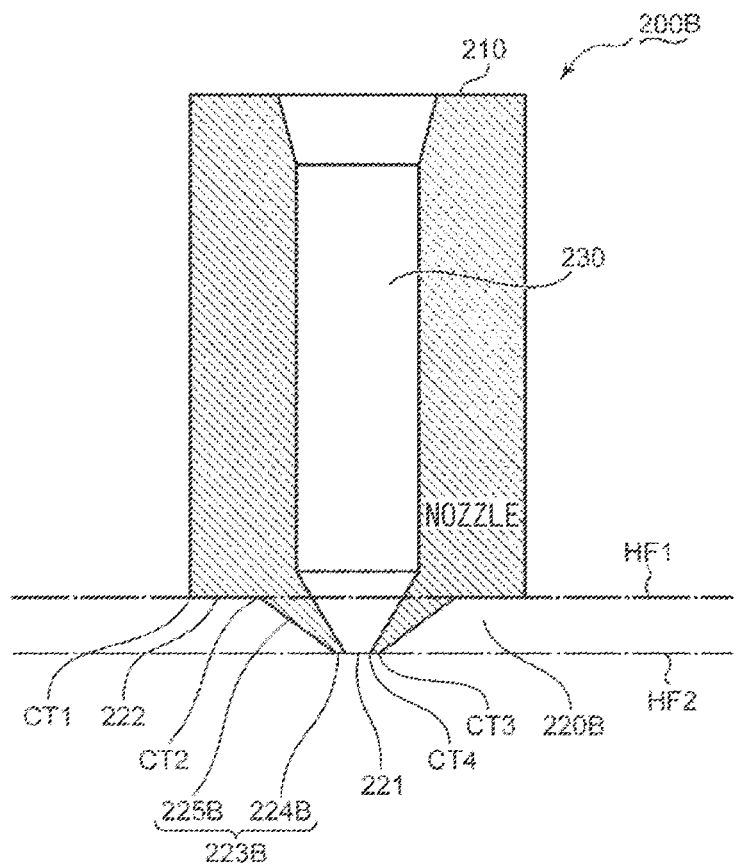
FIG. 4 is a schematic cross-sectional view showing a nozzle according to a third embodiment.

FIG. 4 is a schematic cross-sectional view showing a nozzle 200B of the third embodiment. Referring to FIG. 4, the nozzle 200B will be described. The explanation of the first embodiment is incorporated in the description of the elements denoted by the same reference numerals as those of the first embodiment. In the embodiment, terms like "upward", "downward", "leftward", "rightward", "clockwise", "counterclockwise", "vertical", and "horizontal" indicating directions are used merely for the purpose of making the explanation unambiguous. The principle of the embodiments is not by any means limited by these terms denoting the directions.

Like the first embodiment, the nozzle 200B includes the upper surface 210. Like the first embodiment, the nozzle flow path 230 is formed inside the nozzle 200B. The explanation of the first embodiment is incorporated in the description of the upper surface 210 and the nozzle flow path 230.

The nozzle 200B further includes a lower surface 220B. Like the first embodiment, the lower surface 220B includes the facing surface 222. The explanation of the first embodiment is incorporated in the description of the facing surface 222.

The lower surface 220B further includes a protruding surface 223B that protrudes downward from the facing surface 222. The protruding surface 223B forms a projection which protrudes from the facing surface 222.

FIG. 4 shows two horizontal planes HF1 and HF2. The horizontal plane HF1 is a virtual plane following the facing surface 222. The horizontal plane HF2 is a virtual plane which is defined between the horizontal plane HF1 and an upper surface (not shown) of a receiver (not shown). In the embodiment, a first virtual plane is exemplified by the horizontal plane HF1. A second virtual plane is exemplified by the horizontal plane HF2.

The protruding surface 223B includes an end surface 224B and a circumferential surface 225B. The end surface 224B follows the horizontal plane HF2. The discharge port 221 described in the first embodiment is formed in the end surface 224B. The circumferential surface 225B is a band surface which is formed between the end surface 224B and the facing surface 222 and forms an outer circumferential surface of a cone formed by the protruding surface 223B. In the embodiment, a discharge end surface is exemplified by the end surface 224B.

Figure 5:
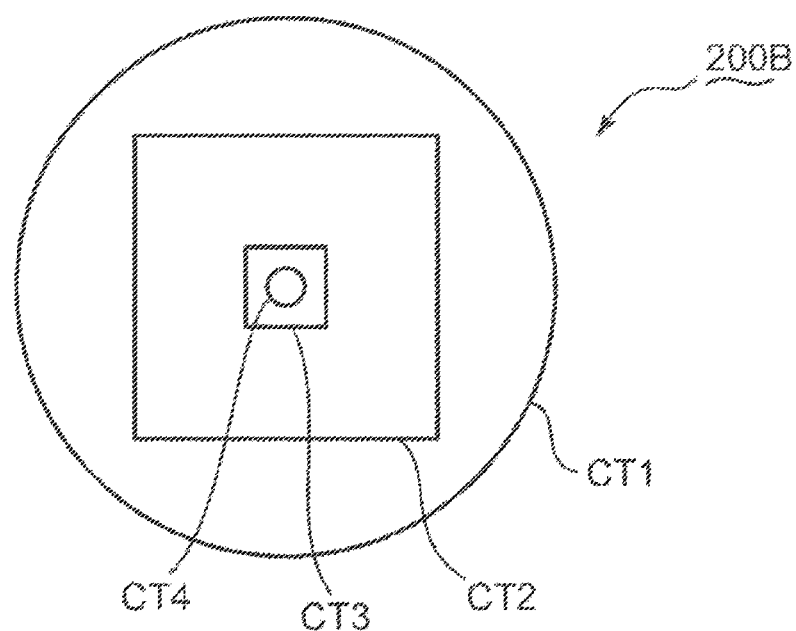
FIG. 5 is a schematic diagram showing four outlines formed on the nozzle shown in FIG. 4.

FIG. 5 shows four outlines CT1, CT2, CT3, and CT4 formed on the nozzle 200B. Referring to FIG. 4 and FIG. 5, the nozzle 200B will be further described.

The outline CT1 shows an outer edge of the facing surface 222 on the horizontal plane HF1. The outline CT2 shows an outline of the circumferential surface 225B on the horizontal plane HF1. The outline CT2 shows a concave corner formed by the facing surface 222 and the circumferential surface 225B. The outline CT2 is surrounded by the outline CT1 as a whole. The outline CT3 shows an outline of the end surface 224B on the horizontal plane HF2. The outline CT3 is surrounded by the outline CT2 as a whole. The outline CT4 shows an outline of the discharge port 221 on the horizontal plane HF2. The outline CT4 is surrounded by the outline CT3 as a whole. In the embodiment, a first outline is exemplified by the outline CT2. A second outline is exemplified by the outline CT3.

In the embodiment, the protruding surface 223B forms a quadrangular pyramid. However, the protruding surface 223B may form other three-dimensional forms (for example, an elliptical cone and a hexagonal cone) if the relation of the above-described outline holds. The principle of the embodiment is not limited to a specific three-dimensional shape formed by the protruding surface 223B.

Fourth Embodiment

The protruding surface of the nozzle described in the third embodiment forms a three-dimensional shape protruding from a facing surface. Alternatively, the protruding surface of the nozzle may form a part of a wall surface forming an outline of a groove portion recessed from the facing surface. In a fourth embodiment, a nozzle including a protruding surface forming a part of the wall surface forming the outline of the groove portion recessed from the facing surface will be described.

Figure 6:
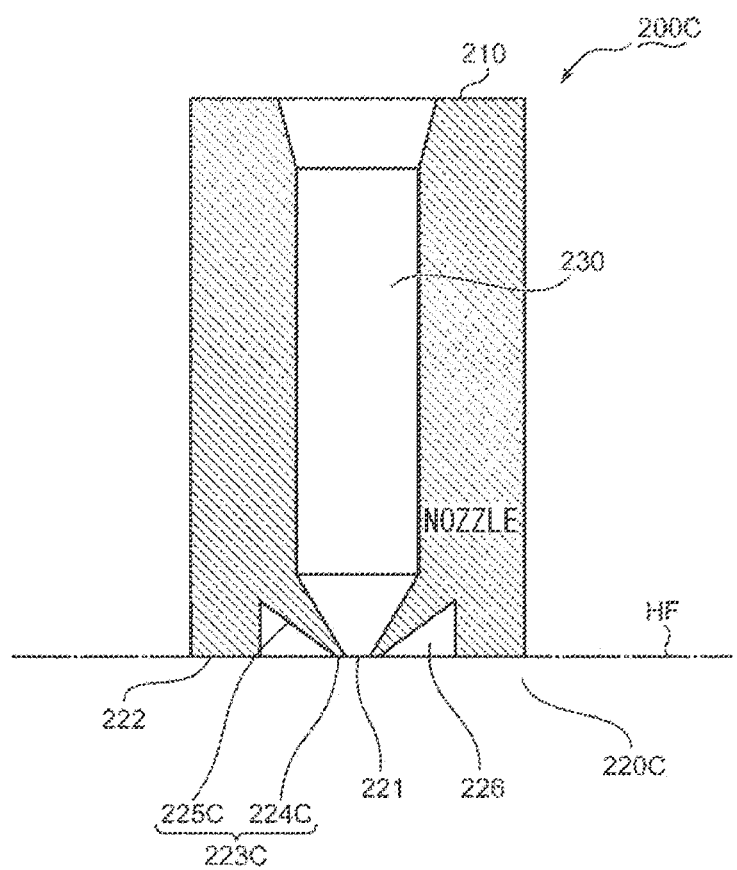
FIG. 6 is a schematic cross-sectional view showing a nozzle according to a fourth embodiment.

FIG. 6 is a schematic cross-sectional view showing a nozzle 200C of the fourth embodiment. Referring to FIG. 6, the nozzle 200C will be described. The explanation of the third embodiment is incorporated in the description of the elements denoted by the same reference numerals as those of the third embodiment. In the embodiment, terms like "upward", "downward", "leftward", "rightward", "clockwise", "counterclockwise", "vertical", and "horizontal" indicating directions are used merely for the purpose of making the explanation unambiguous. The principle of the embodiments is not by any means limited by these terms denoting the directions.

Like the third embodiment, the nozzle 200C includes the upper surface 210. Like the third embodiment, the nozzle flow path 230 is formed inside the nozzle 200C. The explanation of the third embodiment is incorporated in the description of the upper surface 210 and the nozzle flow path 230.

The nozzle 200C further includes a lower surface 220C. Like the third embodiment, the lower surface 220C includes the facing surface 222. The explanation of the third embodiment is incorporated in the description of the facing surface 222.

The lower surface 220C is provided with a groove portion 226 which is recessed from the facing surface 222. The lower surface 220C further includes a protruding surface 223C which is surrounded by the groove portion 226. The protruding surface 223C forms a projection which protrudes downward from the bottom of the groove portion 226.

FIG. 6 shows a virtual horizontal plane HF which follows the facing surface 222. In the embodiment, a first virtual plane is exemplified by the horizontal plane HF.

The protruding surface 223C includes an end surface 224C and a circumferential surface 225C. The discharge port 221 according to the third embodiment is formed in the end surface 224C. In the embodiment, the end surface 224C is flush with the horizontal plane HF. Alternatively, the end surface may be positioned above or below the horizontal plane HF. The principle of the embodiment is not limited to a specific positional relation between the end surface and the horizontal plane HF.

The circumferential surface 225C is a band surface which is formed between the end surface 224C and the bottom of the groove portion 226 and forms an outer circumferential surface of a cone formed by the protruding surface 223C. The circumferential surface 225C forms a part of the outline of the groove portion 226. As described in the first embodiment, when the nozzle 200C is oscillated clockwise, the right half of the circumferential surface 225C collides with the hydraulic fluid blown out from the right inflow port (not shown) of the receiver (not shown). When the nozzle 200C is oscillated counterclockwise, the left half of the circumferential surface 225C collides with the hydraulic fluid blown out from the left inflow port (not shown) of the receiver (not shown). In the embodiment, a first force generation surface is exemplified by the right half or the left half of the circumferential surface 225C. A second force generation surface is exemplified by the left half or the right half of the circumferential surface 225C.

Fifth Embodiment

The hydraulic fluid blown out from the left inflow port or the right inflow port of the receiver flows outward through a narrow gap formed between the facing surface of the nozzle and the upper surface of the receiver. There is a case in which a part of the hydraulic fluid flowing from the outer edge of the facing surface from the hydraulic fluid flows in the vicinity of the outer circumferential surface of the nozzle and is separated from the outer circumferential surface of the nozzle. The separation of the hydraulic fluid from the outer circumferential surface of the nozzle causes a force in a direction opposite to the nozzle movement direction. In order to reduce a drag acting on the outer circumferential surface of the nozzle as a result of the separation of the hydraulic fluid, it is desirable that the hydraulic fluid flowing through a narrow gap formed between the facing surface of the nozzle and the upper surface of the receiver be sufficiently straightened. In a fifth embodiment, an illustrate technique of straightening the hydraulic fluid will be described.

FIG. 7 is a conceptual diagram of the servo-valve 100. The explanation of the first embodiment is incorporated in the description of the servo-valve 100. Referring to FIG. 7, the servo-valve 100 will be described. In the embodiment, terms like "upward", "downward", "leftward", "rightward", "clockwise", "counterclockwise", "vertical", and "horizontal" indicating directions are used merely for the purpose of making the explanation unambiguous. The principle of the embodiments is not by any means limited by these terms denoting the directions.

The nozzle 200 shown in FIG. 7 is positioned at the neutral position. FIG. 7 shows the vertical line VL, the center point LCP of the left inflow port 311, and the center point RCP of the right inflow port 312. FIG. 7 shows the cross-sections of the nozzle 200 and the receiver 300 on the virtual plane enclosing the center points LCP and RCP and the vertical line VL.

FIG. 7 shows two points LIP and RIP of intersection which are defined by the boundary line between the facing surface 222 and the protruding surface 223 and the above-described virtual plane. FIG. 7 further shows two points LOP and ROP of intersection which are defined by the outer edge of the facing surface 222 and the above-described virtual plane. FIG. 7 shows four vectors A, B, C, and D. The vector A extends from the center point LCP to the point LIP of intersection. The vector B extends from the center point LCP to the point LOP of intersection. The vector C extends from the center point RCP to the point RIP of intersection. The vector D extends from the center point RCP to the point ROP of intersection. The designer who designs the nozzle 200 may determine the outline form of the facing surface 222 so that a relation shown in the following inequality holds.

$$\text{Min}(|\vec{B}|, |\vec{D}|) > \text{Max}(|\vec{A}|, |\vec{C}|) \quad [\text{Expression 1}]$$

$$\text{Min}(|\vec{B}|, |\vec{D}|) = |\vec{B}| \text{ if } |\vec{B}| \leq |\vec{D}|$$

$$\text{Min}(|\vec{B}|, |\vec{D}|) = |\vec{D}| \text{ if } |\vec{B}| > |\vec{D}|$$

$$\text{Max}(|\vec{A}|, |\vec{C}|) = |\vec{A}| \text{ if } |\vec{A}| \geq |\vec{D}|$$

$$\text{Max}(|\vec{A}|, |\vec{C}|) = |\vec{C}| \text{ if } |\vec{A}| < |\vec{C}|$$

If the relation of the above-described inequality holds, the outer edge of the facing surface 222 is formed at a position separated from each of the left inflow port 311 and the right inflow port 312 in relation to a distance between the left inflow port 311 and the left half of the circumferential surface 225 of the protruding surface 223 and a distance between the right inflow port 312 and the right half of the circumferential surface 225 of the protruding surface 223. When a difference value DFV determined by the following expression is large, the hydraulic fluid is sufficiently straightened while flowing through a gap between the facing surface 222 of the nozzle 200 and the upper surface 310 of the receiver 300. The designer may determine the outline form of the facing surface 222 to obtain a large difference value DFV.

$$DFV = \text{Min}(|\vec{B}|, |\vec{D}|) - \text{Max}(|\vec{A}|, |\vec{C}|) \quad [\text{Expression 2}]$$

Sixth Embodiment

Immediately after the clockwise oscillation of the nozzle, a part of the high-pressure hydraulic fluid flows into the right flow path of the receiver. When the right flow path is heavily inclined from the vertical line, a part of the hydraulic fluid flowing into the right flow path is reflected upward and collides with the right half of the protruding surface of the nozzle. Immediately after the nozzle is oscillated counterclockwise, a part of the high-pressure hydraulic fluid flows into the left flow path of the receiver. When the left flow path is heavily inclined from the vertical line, a part of the hydraulic fluid flowing into the left flow path is reflected upward and collides with the left half of the protruding surface of the nozzle. Thus, a flow reflected from the right flow path and the left flow path can cause an assisting force in the oscillation of the nozzle. In a sixth embodiment, a technique of improving the response using the reflected flow will be described.

Figure 8A:
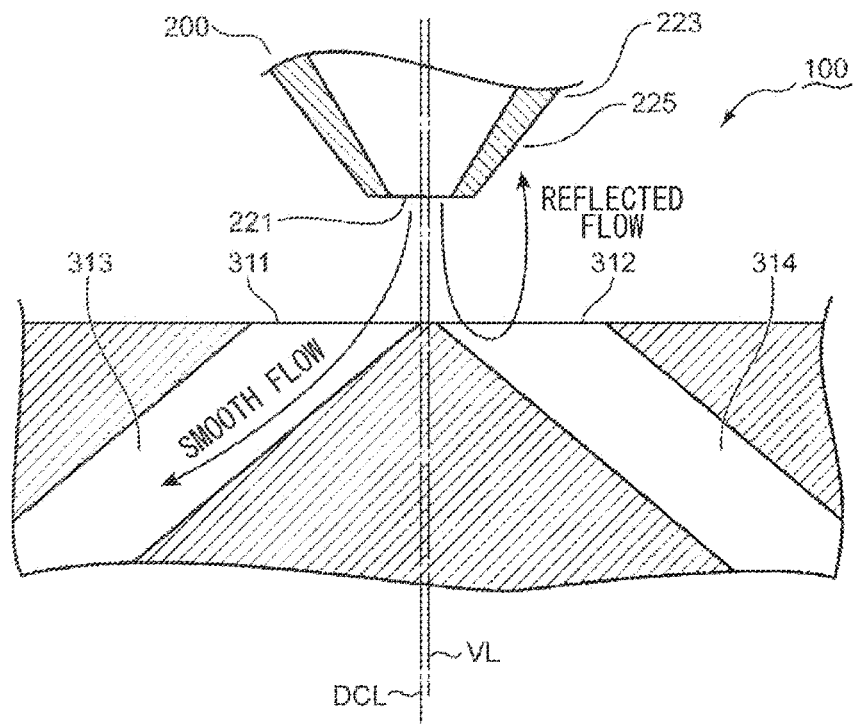
FIG. 8A is a schematic enlarged view showing the servo-valve shown in FIG. 1 (sixth embodiment).
Figure 8B:
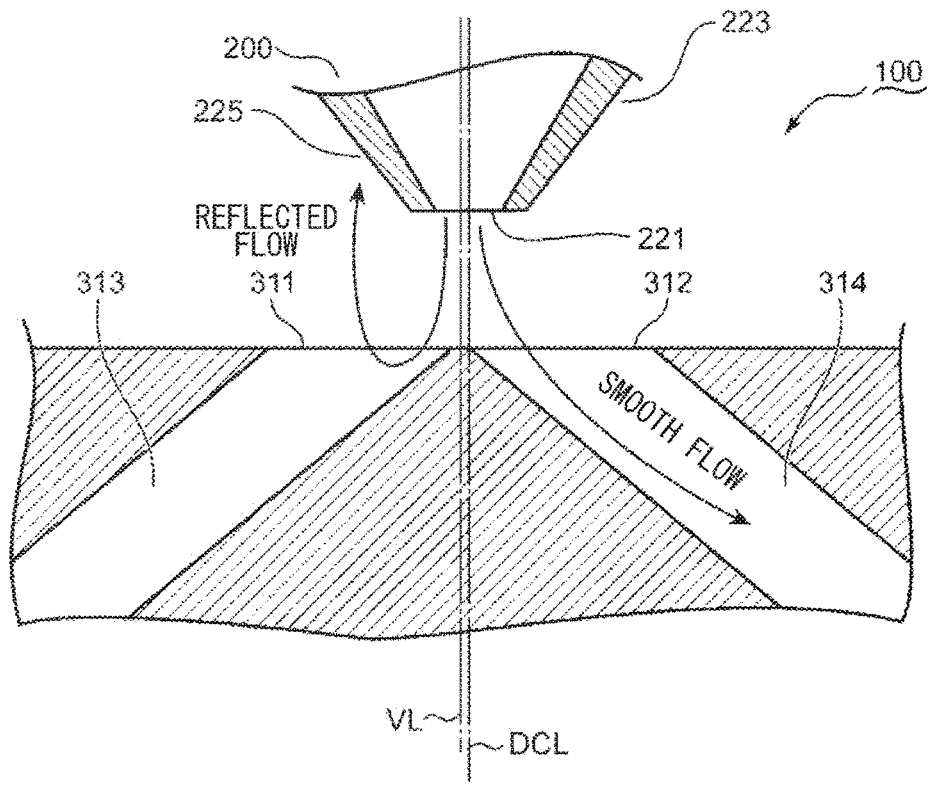
FIG. 8B is a schematic enlarged view showing the servo-valve shown in FIG. 1 (sixth embodiment).

FIG. 8A and FIG. 8B are schematic enlarged views of the servo-valve 100 in the periphery of the protruding surface 223. The explanation of the first embodiment is incorporated in the description of the servo-valve 100. Referring to FIG. 8, the servo-valve 100 will be described. In the embodiment, terms like "upward", "downward", "leftward", "rightward", "clockwise", "counterclockwise", "vertical", and "horizontal" indicating directions are used merely for the purpose of making the explanation unambiguous. The principle of the embodiments is not by any means limited by these terms denoting the directions.

The nozzle 200 shown in FIG. 8A is slightly oscillated clockwise from the neutral position. At this time, most of the hydraulic fluid discharged from the discharge port 221 flows into the left flow path 313 extended from the left inflow port 311 to the lower left side and a part of the hydraulic fluid flows into the right flow path 314 extended from the right inflow port 312 to the right lower side. When the nozzle 200 is oscillated clockwise so that the inclination angle of the discharge line DCL from the vertical line VL increases, the inclination angle of the discharge line DCL from the vertical line VL approaches the inclination angle of the left flow path 313 from the vertical line VL. All this while, an angle between the discharge line DCL from the vertical line VL and the center line of the right flow path 314 becomes substantially a right angle. Thus, when the nozzle 200 is oscillated clockwise from the neutral position, the hydraulic fluid flowing into the left inflow port 311 smoothly flows along the left flow path 313 and the hydraulic fluid which flows into the right inflow port 312 is easily reflected by the wall surface of the right flow path 314.

When the nozzle 200 is oscillated clockwise from the neutral position, the right half of the circumferential surface 225 of the protruding surface 223 which is positioned at a position right above the right inflow port 312 has an inclination which is parallel to the upper surface 310 of the receiver 300 (that is, the right inflow port 312) when the nozzle 200 is positioned at the neutral position. Thus, the right half of the circumferential surface 225 of the protruding surface 223 easily collides with the hydraulic fluid reflected by the wall surface of the right flow path 314. The collision between the right half of the circumferential surface 225 of the protruding surface 223 and the hydraulic fluid reflected by the wall surface of the right flow path 314 results in an assisting force of assisting the clockwise oscillation of the nozzle 200. Thus, the nozzle 200 is highly responsively oscillated clockwise.

The nozzle 200 shown in FIG. 8B is slightly oscillated counterclockwise from the neutral position. At this time, most of the hydraulic fluid discharged from the discharge port 221 flows into the right flow path 314 and a part of the hydraulic fluid flows into the left flow path 313. When the nozzle 200 is oscillated counterclockwise so that the inclination angle of the discharge line DCL from the vertical line VL increases, the inclination angle of the discharge line DCL from the vertical line VL approaches the inclination angle of the right flow path 314 from the vertical line VL. All this while, an angle between the discharge line DCL from the vertical line VL and the center line of the left flow path 313 approaches a right angle. Thus, when the nozzle 200 is oscillated counterclockwise from the neutral position, the hydraulic fluid which flows into the right inflow port 312 smoothly flows along the right flow path 314 and the hydraulic fluid which flows into the left inflow port 311 is easily reflected by the wall surface of the left flow path 313.

When the nozzle 200 is oscillated counterclockwise from the neutral position, the left half of the circumferential surface 225 of the protruding surface 223 positioned right above the left inflow port 311 has an inclination parallel to the upper surface 310 of the receiver 300 (that is, the left inflow port 311) compared to a case where the nozzle 200 is positioned at the neutral position. Thus, the left half of the circumferential surface 225 of the protruding surface 223 easily collides with the hydraulic fluid reflected by the wall surface of the left flow path 313. The collision between the left half of the circumferential surface 225 of the protruding surface 223 and the hydraulic fluid reflected by the wall surface of the left flow path 313 results in an assisting force of assisting the counterclockwise oscillation of the nozzle 200. Thus, the nozzle 200 is highly responsively oscillated counterclockwise.

In the embodiment, a first flow path is exemplified by one of the right flow path 314 and the left flow path 313. A second flow path is exemplified by the other of the right flow path 314 and the left flow path 313. A first flow path wall is exemplified by a flow path wall forming one of the right flow path 314 and the left flow path 313. A second flow path wall is exemplified by a flow path wall forming the other of the right flow path 314 and the left flow path 313. A first fluid is exemplified by the hydraulic fluid flowing into one of the right flow path 314 and the left flow path 313. A second fluid is exemplified by the hydraulic fluid flowing into the other of the right flow path 314 and the left flow path 313.

Seventh Embodiment

The servo-valve according to the above-described embodiment can be assembled to various fluidic devices driven by the hydraulic fluid. In a seventh embodiment, an illustrative fluidic device will be described.

Figure 9:
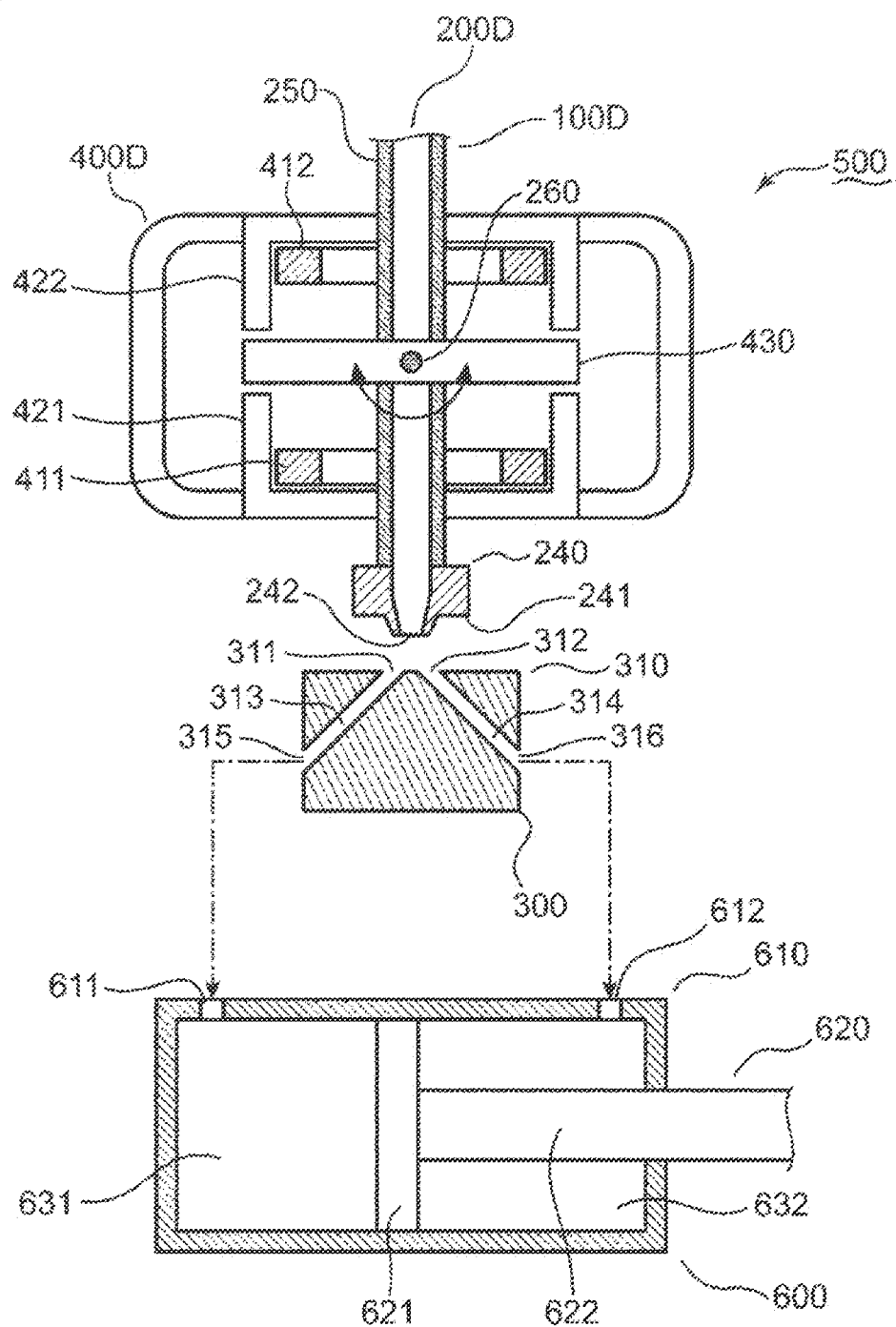
FIG. 9 is a schematic diagram showing a fluidic device according to a seventh embodiment.

FIG. 9 is a schematic diagram showing a fluidic device 500 of the seventh embodiment. Referring to FIG. 1 and FIG. 9, the fluidic device 500 will be described. The explanation of the first embodiment is incorporated in the description of the elements indicated by the same reference numerals as in the first embodiment.

The fluidic device 500 includes a servo-valve 100D and an actuator 600. Like the first embodiment, the servo-valve 100D includes a receiver 300. The explanation of the first embodiment is incorporated in the description of the receiver 300. The left flow path 313 and the right flow path 314 formed in the receiver 300 may be designed based on the design principle described in the sixth embodiment.

The servo-valve 100D includes a torque motor 400D. The torque motor 400D corresponds to the driving unit 400 described with reference to FIG. 1. The explanation of the driving unit 400 is incorporated in the description of the torque motor 400D.

The torque motor 400D includes a lower coil 411, an upper coil 412, a lower magnetic piece 421, an upper magnetic piece 422, and a magnetic rod 430. The upper coil 412 is disposed above the lower coil 411. The lower magnetic piece 421 may be formed in a substantially cylindrical form. The lower coil 411 is accommodated inside the lower magnetic piece 421. Like the lower magnetic piece 421, the upper magnetic piece 422 may be formed in a substantially cylindrical form. The upper coil 412 is disposed inside the upper magnetic piece 422. The lower edge of the upper magnetic piece 422 faces the upper edge of the lower magnetic piece 421. The magnetic rod 430 extends substantially horizontally. The left and right ends of the magnetic rod 430 are positioned inside a gap between the upper edge of the lower magnetic piece 421 and the lower edge of the upper magnetic piece 422.

A current is supplied to the lower coil 411 and the upper coil 412. As a result, the lower magnetic piece 421 and the upper magnetic piece 422 serve as magnets. When a current is supplied to the lower coil 411 and the upper coil 412 so that the right end of the magnetic rod 430 is pulled to the lower magnetic piece 421 and the left end of the magnetic rod 430 is pulled to the upper magnetic piece 422, the magnetic rod 430 rotates clockwise. When a current is supplied to the lower coil 411 and the upper coil 412 so that the left end of the magnetic rod 430 is pulled to the lower magnetic piece 421 and the right end of the magnetic rod 430 is pulled to the upper magnetic piece 422, the magnetic rod 430 rotates counterclockwise.

The servo-valve 100D includes a nozzle portion 200D. The nozzle portion 200D corresponds to the nozzle 200 described with reference to FIG. 1. The explanation of the nozzle 200 may be incorporated in the description of the nozzle portion 200D.

The nozzle portion 200D includes a nozzle piece 240, a flexible tube 250, and a coupling shaft 260. The flexible tube 250 extends vertically to penetrate the torque motor 400D. The nozzle piece 240 is attached to the lower end of the flexible tube 250. The high-pressure hydraulic fluid is supplied to the flexible tube 250. The hydraulic fluid is guided by the flexible tube 250 to reach the nozzle piece 240.

The nozzle piece 240 includes a lower surface 241 which faces the upper surface 310 of the receiver 300. The lower surface 241 is provided with a discharge port 242. The protruding form of the lower surface 241 is determined based on the design principle described in the above-described embodiments. The high-pressure hydraulic fluid which is supplied to the nozzle piece 240 is discharged from the discharge port 242. Subsequently, the hydraulic fluid flows into the receiver 300.

The coupling shaft 260 is used so that the flexible tube 250 is coupled to an intermediate portion of the magnetic rod 430. The flexible tube 250 and the nozzle piece 240 move left and right in a reciprocating manner in response to the clockwise and counterclockwise rotations of the magnetic rod 430. In the embodiment, the first position is exemplified by the position of the nozzle piece 240 moving left or right from the neutral position (the position of the nozzle piece 240 in which the point of intersection between the upper surface 310 of the receiver 300 and the extended line extended from the center of the discharge port 242 in the hydraulic fluid discharge direction is located between the left inflow port 311 and the right inflow port 312). The second position is exemplified by the position of the nozzle piece 240 moving right or left from the neutral position.

When the magnetic rod 430 rotates about the coupling shaft 260 clockwise, the nozzle piece 240 moves leftward. As a result, the area of overlapping between the discharge port 242 and the left inflow port 311 increases and the area of overlapping between the discharge port 242 and the right inflow port 312 decreases. In this case, the amount of the hydraulic fluid flowing into the left flow path 313 formed inside the receiver 300 exceeds the flow rate of the hydraulic fluid flowing into the right flow path 314.

When the magnetic rod 430 rotates about the coupling shaft 260 counterclockwise, the nozzle piece 240 moves rightward. As a result, the area of overlapping between the discharge port 242 and the right inflow port 312 increases and the area of overlapping between the discharge port 242 and the left inflow port 311 decreases. In this case, the amount of the hydraulic fluid flowing into the right flow path 314 formed inside the receiver 300 exceeds the flow rate of the hydraulic fluid flowing into the left flow path 313.

The actuator 600 includes a casing 610 and a movable piece 620. The casing 610 is provided with two ports 611 and 612. The port 611 of the actuator 600 is connected in fluid communication with the left outflow port 315 of the receiver 300. That is, the port 611 of the actuator 600 is connected to the left flow path 313 extended from the left inflow port 311 of the receiver 300. The port 612 of the actuator 600 is connected in fluid communication with the right outflow port 316 of the receiver 300. That is, the port 612 of the actuator 600 is connected to the right flow path 314 extended from the right inflow port 312 of the receiver 300. In the embodiment, a first outflow port is exemplified by one of the port 611 and the port 612. A second outflow port is exemplified by the other of the port 611 and the port 612.

The movable piece 620 includes a partition wall 621 and a rod 622. The partition wall 621 divides the inner space of the casing 610 into a left chamber 631 and a right chamber 632. The port 611 is coupled to the left chamber 631. The left chamber 631 forms a terminal end portion of the flow path of the hydraulic fluid which flows into the left flow path 313. The port 612 is coupled to the right chamber 632. The right chamber 632 forms a terminal end portion of the flow path of the hydraulic fluid flowing into the right flow path 314. The rod 622 extends right from the partition wall 621 and protrudes to the outside of the casing 610. The rod 622 is connected to other external devices (not shown) disposed outside the casing 610. In the embodiment, a hollow portion is exemplified by the inner space of the casing 610.

When the nozzle piece 240 moves leftward, the hydraulic fluid mainly flows from the discharge port 242 of the nozzle piece 240 to the left inflow port 311 of the receiver 300. Subsequently, the hydraulic fluid which flows into the left inflow port 311 flows into the left chamber 631 through the left flow path 313 of the receiver 300, the left outflow port 315 of the receiver 300, and the port 611 of the actuator 600. As a result, the inner pressure of the left chamber 631 increases so that the movable piece 620 moves rightward. All this while, the hydraulic fluid existing inside the right chamber 632 is blown out from the right inflow port 312 through the port 612 of the actuator 600, the right outflow port 316 of the receiver 300, and the right flow path 314 of the receiver 300. The hydraulic fluid blown out from the right inflow port 312 collides with the protruding portion formed in the lower surface 241 of the nozzle piece 240 and gives an assisting force of assisting the left movement of the nozzle piece 240 to the nozzle piece 240. Thus, the nozzle piece 240 can highly responsively move left.

When the nozzle piece 240 moves rightward, the hydraulic fluid mainly flows from the discharge port 242 of the nozzle piece 240 to the right inflow port 312 of the receiver 300. Subsequently, the hydraulic fluid which flows into the right inflow port 312 flows into the right chamber 632 through the right flow path 314 of the receiver 300, the right outflow port 316 of the receiver 300, and the port 612 of the actuator 600. As a result, the inner pressure of the right chamber 632 increases so that the movable piece 620 moves leftward. All this while, the hydraulic fluid existing inside the left chamber 631 is blown out from the left inflow port 311 through the port 611 of the actuator 600, the left outflow port 315 of the receiver 300, and the left flow path 313 of the receiver 300. The hydraulic fluid blown out from the left inflow port 311 collides with the protruding portion formed in the lower surface 241 of the nozzle piece 240 and gives an assisting force of assisting the right movement of the nozzle piece 240 to the nozzle piece 240. Thus, the nozzle piece 240 can highly responsively move right.

In FIG. 9, the receiver 300 is drawn separately from the casing 610 of the actuator 600. However, the receiver 300 may be integrated with the casing 610 of the actuator 600.

Eighth Embodiment

The actuator described in the seventh embodiment is directly coupled to the receiver. Alternatively, the spool valve may be disposed between the receiver and the actuator. In an eighth embodiment, an illustrative fluidic device including the spool valve will be described.

Figure 10:
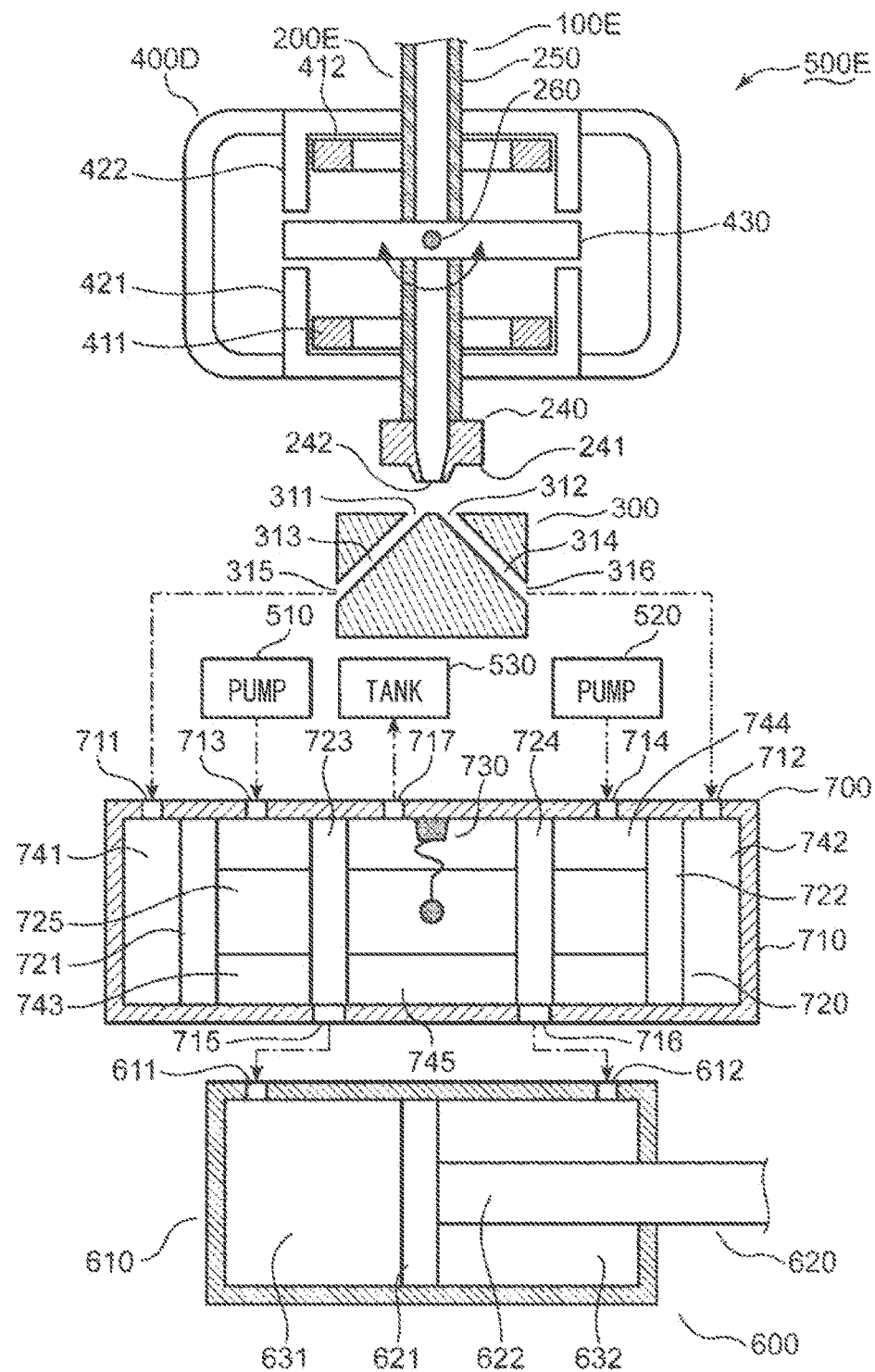
FIG. 10 is a schematic diagram showing a fluidic device according to an eighth embodiment.

FIG. 10 is a schematic diagram showing a fluidic device 500E of the eighth embodiment. Referring to FIG. 10, the fluidic device 500E will be described. The explanation of the seventh embodiment is incorporated in the description of the elements denoted by the same reference numerals as those of the seventh embodiment.

Like the seventh embodiment, the fluidic device 500E includes the actuator 600. The explanation of the seventh embodiment is incorporated in the description of the actuator 600.

The fluidic device 500 E further includes aservo-valve 100E, two pumps 510 and 520, and a tank 530. Like the seventh embodiment, a servo-valve 100E includes a nozzle portion 200E, the receiver 300, and a torque motor 400D. The explanation of the seventh embodiment is incorporated in the description of these elements.

The servo valve 100E further includes a spoolvalve 700. The spool valve 700 includes a casing 710, a spool 720, and a cantilever spring 730. The spool 720 is disposed inside the casing 710. As a result, a flow path through which the hydraulic fluid flows is formed inside the casing 710. The cantilever spring 730 is used so that the casing 710 and the spool 720 are coupled to each other. The cantilever spring 730 applies a force of keeping the spool 720 at the closed position to the spool 720. When the spool 720 is located at the closed position, the spool valve 700 interrupts the hydraulic fluid supply path from the pumps 510 and 520 to the actuator 600. When the spool 720 moves leftward or rightward from the closed position, the spool valve 700 opens the hydraulic fluid supply path from the pumps 510 and 520 to the actuator 600.

The casing 710 is provided with seven ports 711 to 717. The port 711 is connected in fluid communication with the left outflow port 315 of the receiver 300. The port 712 is connected in fluid communication with the right outflow port 316 of the receiver 300. The pumps 510 and 520 are respectively attached to the ports 713 and 714. The ports 715 and 716 are connected in fluid communication with the actuator 600. The tank 530 is attached to the port 717.

The spool 720 includes four partition walls 721, 722, 723, and 724 and a coupling shaft 725 used so that the partition walls 721, 722, 723, and 724 are coupled to one another. The coupling shaft 725 extends substantially horizontally. The partition wall 721 is formed at the left end of the coupling shaft 725. The partition wall 722 is formed at the right end of the coupling shaft 725. The partition wall 723 is located between the partition walls 721 and 722. The partition wall 724 is located between the partition walls 722 and 723.

The partition walls 721, 722, 723, and 724 divide the inner space of the casing 710 into five chambers 741, 742, 743, 744, and 745. The chamber 741 moves to the leftmost side. The chamber 742 moves to the rightmost side. The chamber 743 is formed between the partition walls 721 and 723. The chamber 744 is formed between the partition walls 722 and 724. The chamber 745 is formed between the partition walls 723 and 724.

When the nozzle piece 240 moves leftward, the hydraulic fluid mainly flows from the discharge port 242 of the nozzle piece 240 to the left inflow port 311 of the receiver 300. Subsequently, the hydraulic fluid which flows into the left inflow port 311 flows into the chamber 741 through the left flow path 313 of the receiver 300, the left outflow port 315 of the receiver 300, and the port 711 of the spool valve 700. As a result, the inner pressure of the chamber 741 increases and the spool 720 moves rightward from the closed position. All this while, the hydraulic fluid which exists inside the chamber 742 is blown out from the right inflow port 312 through the port 712 of the spool valve 700, the right outflow port 316 of the receiver 300, and the right flow path 314 of the receiver 300. The hydraulic fluid blown out from the right inflow port 312 collides with the protruding portion formed in the lower surface 241 of the nozzle piece 240 and gives an assisting force of assisting the left movement of the nozzle piece 240 to the nozzle piece 240. Thus, the nozzle piece 240 can highly responsively move left.

Subsequently, when the nozzle piece 240 returns to the neutral position, the hydraulic fluid ejected from the discharge port 242 of the nozzle piece 240 flows in substantially in the same quantity into the left inflow port 311 and the right inflow port 312 of the receiver 300. All this while, a force exerted on the left side of the spool 720 is larger than a force exerted on the right side of the spool 720 by a magnitude commensurate with the resilience of the cantilever spring 730. Thus, the spool 720 moves leftward and returns to the closed position.

When the nozzle piece 240 moves rightward, the hydraulic fluid mainly flows from the discharge port 242 of the nozzle piece 240 to the right inflow port 312 of the receiver 300. Subsequently, the hydraulic fluid which flows into the right inflow port 312 flows into the chamber 742 through the right flow path 314 of the receiver 300, the right outflow port 316 of the receiver 300, and the port 712 of the spool valve 700. As a result, the inner pressure of the chamber 742 increases and the spool 720 moves leftward from the closed position. All this while, the hydraulic fluid which exists inside the chamber 741 is blown out from the left inflow port 311 through the port 711 of the spool valve 700, the left outflow port 315 of the receiver 300, and the left flow path 313 of the receiver 300. The hydraulic fluid blown out from the left inflow port 311 collides with the protruding portion formed in the lower surface 241 of the nozzle piece 240 and gives an assisting force of assisting the right movement of the nozzle piece 240 to the nozzle piece 240. Thus, the nozzle piece 240 can highly responsively move right.

Subsequently, when the nozzle piece 240 returns to the neutral position, the hydraulic fluid which is ejected from the discharge port 242 of the nozzle piece 240 flows in substantially in the same quantity into the left inflow port 311 and the right inflow port 312 of the receiver 300. All this while, a force exerted on the right side of the spool 720 is larger than a force exerted on the left side of the spool 720 by a magnitude commensurate with the resilience of the cantilever spring 730. Thus, the spool 720 moves rightward and returns to the closed position.

In the embodiment, the first movable piece is exemplified by the spool 720. The first outflow port is exemplified by one of the ports 711 and 712. The second outflow port is exemplified by the other of the ports 711 and 712.

When the spool 720 is located at the closed position, the partition wall 723 closes the port 715. At this time, the partition wall 724 closes the port 716. The pump 510 supplies the high-pressure hydraulic fluid to the chamber 743 through the port 713. The pump 520 supplies the high-pressure hydraulic fluid to the chamber 744 through the port 714. When the spool 720 moves rightward from the closed position, the hydraulic fluid supply path from the chamber 743 to the actuator 600 and the hydraulic fluid discharge path from the actuator 600 to the chamber 745 are opened. When the spool 720 moves leftward from the closed position, the hydraulic fluid supply path from the chamber 744 to the actuator 600 and the hydraulic fluid discharge path from the actuator 600 to the chamber 745 are opened. Thus, the amount of the hydraulic fluid flowing from the ports 715 and 716 to the actuator 600 is adjusted by the left and right movement of the nozzle piece 240.

When the spool 720 moves rightward from the closed position, the hydraulic fluid which is supplied from the pump 510 to the chamber 743 through the port 713 flows into the left chamber 631 through the ports 715 and 611. Since the inner pressure of the left chamber 631 increases, the movable piece 620 moves rightward. All this while, the right chamber 632 communicates with the chamber 745 through the ports 612 and 716. The hydraulic fluid which exists inside the right chamber 632 is extruded from the right chamber 632 by the movable piece 620 moving right so that the hydraulic fluid flows to the chamber 745. Subsequently, the hydraulic fluid which flows into the chamber 745 is stored in the tank 530.

When the spool 720 moves leftward from the closed position, the hydraulic fluid which is supplied from the pump 520 to the chamber 744 through the port 714 flows into the right chamber 632 through the ports 716 and 612. Since the inner pressure of the right chamber 632 increases, the movable piece 620 moves leftward. All this while, the left chamber 631 communicates with the chamber 745 through the ports 611 and 715. The hydraulic fluid which exists inside the left chamber 631 is extruded from the left chamber 631 by the movable piece 620 moving left so that the hydraulic fluid flows into the chamber 745. Subsequently, the hydraulic fluid which flows into the chamber 745 is stored in the tank 530. In the embodiment, the second movable piece is exemplified by the movable piece 620.

In FIG. 10, the receiver 300 is drawn separately from the casing 710 of the spool valve 700. However, the receiver 300 may be integrated with the casing 710 of the spool valve 700.

In the embodiment, the cantilever spring 730 is coupled to the spool 720 and the casing 710. Instead of the cantilever spring 730, an elastic member coupling the spool 720 and the nozzle portion 200E to each other may be used.

Ninth Embodiment

The inventors analyzed a relation between the form of the lower surface of the nozzle and the force (the flow force) applied from the hydraulic fluid to the nozzle by using two models in which the lower surface of the nozzle has a different form. In a ninth embodiment, an analysis result will be described.

Figure 11A:
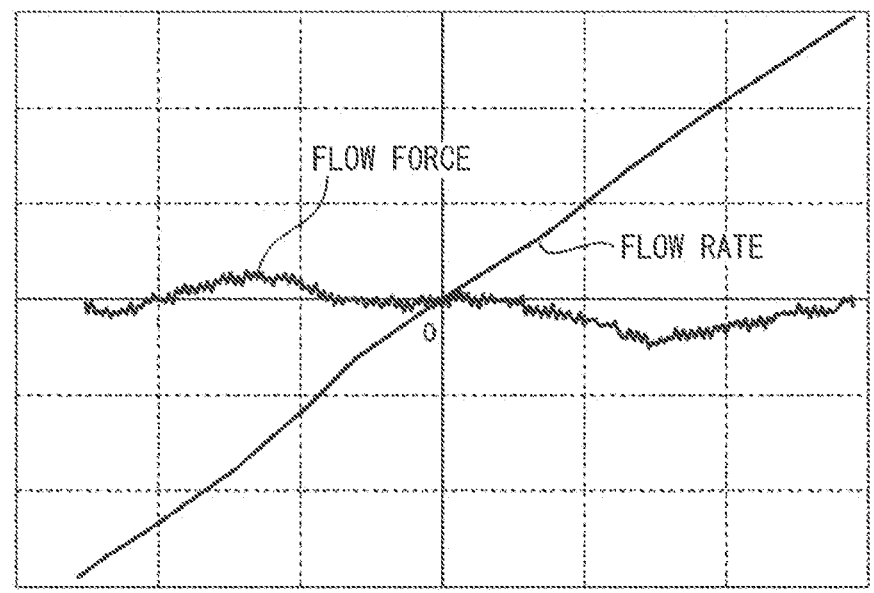
FIG. 11A is a graph showing a relation among a relative position of a nozzle with respect to a receiver, a flow rate of a hydraulic fluid discharged from the nozzle, and a force applied from a hydraulic fluid to the nozzle (ninth embodiment).
Figure 11B:
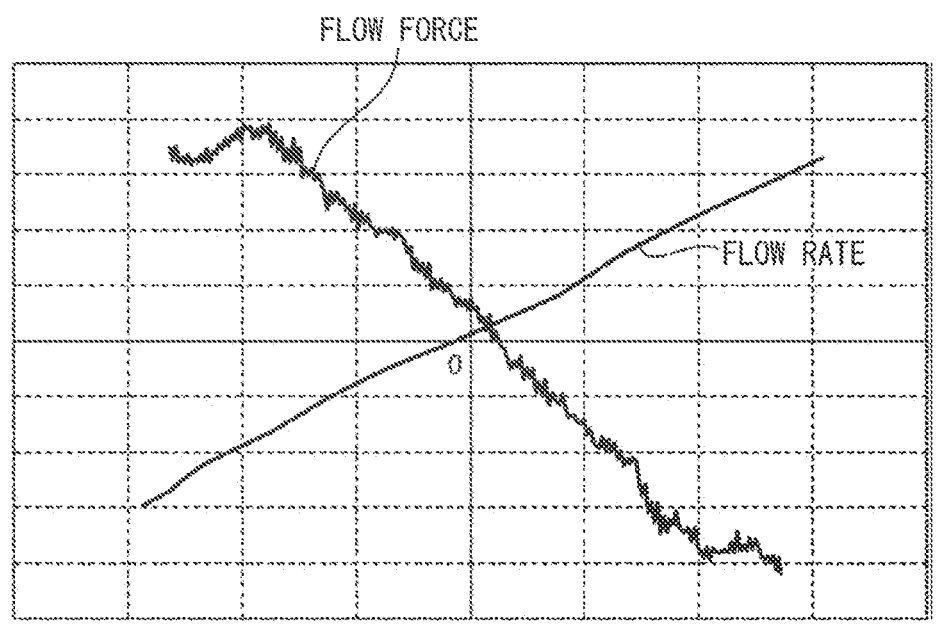
FIG. 11B is a graph showing a relation among a relative position of a nozzle with respect to a receiver, a flow rate of a hydraulic fluid discharged from the nozzle, and a force applied from a hydraulic fluid to the nozzle (ninth embodiment).

FIG. 11A and FIG. 11B are graphs showing a relation among the relative position of the nozzle with respect to the receiver, the flow rate of the hydraulic fluid discharged from the nozzle, and the force applied from the hydraulic fluid to the nozzle. The data shown in FIG. 11A can be obtained from the nozzle which is designed based on the design principle described in the first embodiment and the lower surface of the nozzle is provided with a truncated conical protrusion. The data shown in FIG. 11B can be obtained from the known nozzle and lower surface of the nozzle is flat (that is, no protrusion exist on the lower surface of the nozzle). Referring to FIG. 11A and FIG. 11B, an advantageous effect obtained from the protrusion form of the lower surface of the nozzle will be described.

The horizontal axes of the graphs of FIG. 11A and FIG. 11B respectively represent the relative position of the nozzle with respect to the receiver. The original points of the graphs of FIG. 11A and FIG. 11B represent the neutral positions. The vertical axes of the graphs of FIG. 11A and FIG. 11B represent the hydraulic fluid discharge amount and the force applied from the hydraulic fluid to the nozzle.

Regarding the nozzle movement direction and the flow force, the "positive" direction of FIG. 11A and FIG. 11B represents the "right side". The "negative" direction of FIG. 11A and FIG. 11B represents the "left side".

The nozzle receives a pressure of the hydraulic fluid inside the nozzle flow path or a force caused by the separation of the hydraulic fluid in the vicinity of the outer circumferential surface of the nozzle in addition to the force applied from the hydraulic fluid blown out from the receiver. The pressure of the hydraulic fluid inside the nozzle flow path or the force caused by the separation of the hydraulic fluid in the vicinity of the outer circumferential surface of the nozzle acts as a drag in a direction opposite to the nozzle displacement direction.

The average value of the flow force shown in FIG. 11A is remarkably smaller than the average value of the flow force shown in FIG. 11B. This means that the collision between the protrusion formed in the lower surface of the nozzle and the hydraulic fluid blown out from the receiver cancels the above-described drag. Since the drag for the movement of the nozzle including the lower surface provided with the protrusion is reduced throughout the stroke of the nozzle, the nozzle including the lower surface provided with the protrusion can highly responsively move left and right. Meanwhile, since the drag for the movement of the nozzle including the flat lower surface is not substantially reduced, the nozzle including the flat lower surface is worse in response than the nozzle including the lower surface provided with the protrusion.

The variation width of the flow force shown in FIG. 11A is remarkably smaller than the variation width of the flow force shown in FIG. 11B. This means that the position control of the nozzle is hardly influenced by the stroke position of the nozzle or the flow rate of the hydraulic fluid when the lower surface of the nozzle is provided with the protrusion. Thus, the nozzle described in the above-described embodiments is better than the known nozzle from the viewpoint of the response and the position control accuracy.

The embodiments of the invention have been described above. In the servo-valve according to the embodiment, the nozzle is provided with the force generation portion which causes an assisting force colliding with the fluid blown out from the inflow port and acting in a direction matching the displacement direction. Accordingly, since the nozzle easily receives the assisting force acting in the displacement direction, the response speed of the actuator is improved.

Figure 12:
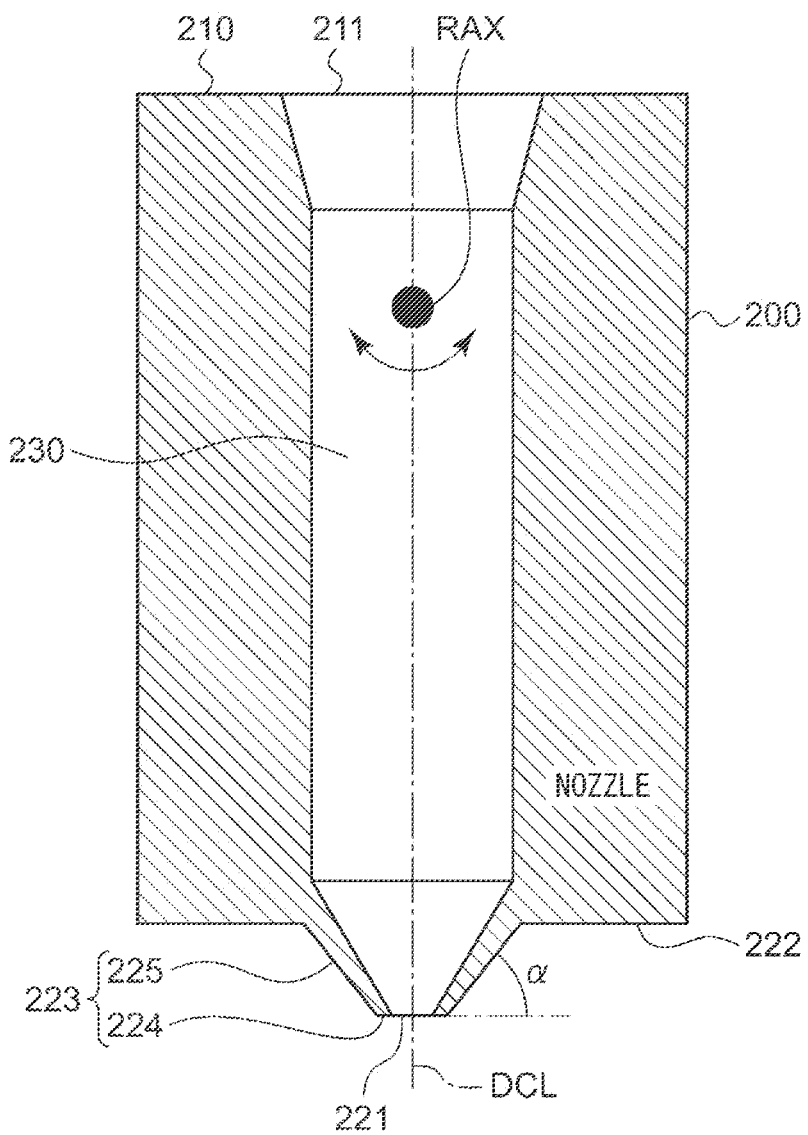
FIG. 12 is a diagram describing a peripheral angle of the nozzle of the embodiment.

Here, in the cross-section passing through the discharge line DCL of the nozzle 200 shown in FIG. 12, an angle which is formed by the circumferential surface 225 and the discharge line DCL is set to a peripheral angle α. The peripheral angle α is set in response to, for example, the flow rate of the fluid. For example, the peripheral angle α is set to be large when the flow rate of the fluid is small and the peripheral angle α is set to be small when the flow rate is large in order to allow the nozzle 200 to move by an appropriate assisting force. The peripheral angle α is desirably 0 to 60°, more desirably 3 to 50°, further desirably 5 to 40°, and particularly desirably 8 to 30°. A vibration model is considered in which the nozzle 200 is connected to the spool 720 and the fluid in the servo-valve 100. In this model, when the flow force increases so that an equivalent spring constant caused by the fluid increases, the operation becomes unstable due to the vibration of the nozzle 200. Here, an angle in which the flow force increases so that the operation of the nozzle 200 becomes unstable is set to the upper limit of the peripheral angle α. Further, an angle in which the flow force for the servo-valve 100 becomes zero is set to the lower limit of the peripheral angle α.

Figure 13:
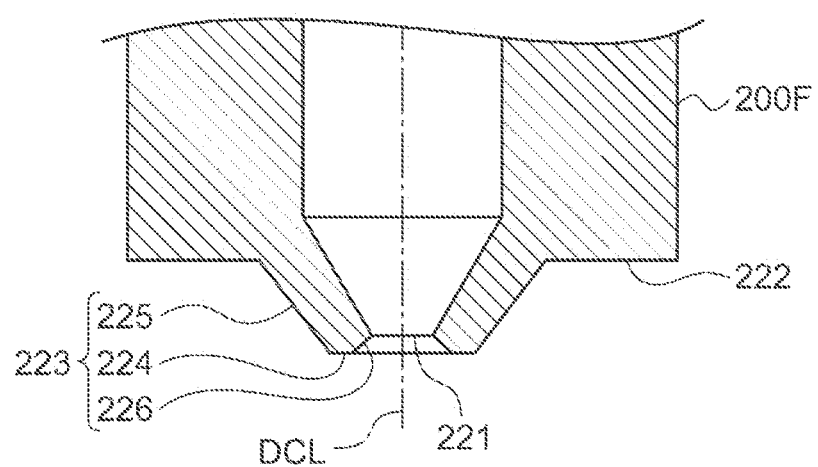
FIG. 13 is a diagram showing a modified example of the nozzle of the embodiment.

FIG. 13 is a partially enlarged view of a nozzle 200F according to a modified example. The nozzle 200F shown in FIG. 13 is provided with a recess 226 which is continuous from the end surface 224 to the discharge port 221. The recess 226 extends upward along the discharge line DCL from the end surface 224 and is formed in a truncated cone form of which a diameter decreases upward. Like the circumferential surface 225, the inner peripheral surface of the recess 226 receives an assisting force acting in the displacement direction of the nozzle 200F. Accordingly, the assisting force exerted on the nozzle 200F increases. In addition, the form of the recess 226 is not limited thereto and may be different from the illustrative form.

The design principle described in the above-described various embodiments can be applied to various servo-valves and various fluidic devices. A part of various features described in one of the above-described various embodiments may be applied to the servo-valve and the fluidic device described in other embodiments.

An aspect of the invention is as follows. A servo-valve according to an aspect controls a fluid discharged from a discharge port of a nozzle by displacing the nozzle and drives an actuator. The servo-valve includes a receiver that includes an inflow surface provided with a first inflow port and a second inflow port into which the fluid discharged from the discharge port flows. The nozzle includes a force generation portion that includes an end surface provided with the discharge port and an outer circumferential surface formed in the periphery of the end surface. When the nozzle is displaced from a neutral position in which an extended line extended from a center of the discharge port intersects the inflow surface between the first inflow port and the second inflow port toward a position in which the extended line intersects the first inflow port, the fluid inside the second inflow port is blown out toward the nozzle. The force generation portion collides with the fluid blown out from the second inflow port and causes an assisting force in a direction matching the nozzle displacement direction.

According to the above-described configuration, since the force generation portion collides with the fluid blown out from the second inflow port and causes an assisting force in a direction matching the nozzle displacement direction toward the first inflow port, the displacement of the nozzle toward the first inflow port is assisted by the assisting force. Since the nozzle can be quickly displaced toward the first inflow port under the action of the assisting force, the servo-valve can quickly drive the actuator.

In the above-described confirmation, when the nozzle is displaced from the neutral position toward a position in which the extended line intersects the second inflow port, the fluid inside the first inflow port may be blown out toward the nozzle. The force generation portion may collide with the fluid blown out from the first inflow port and cause an assisting force in a direction matching the nozzle displacement direction toward the second inflow port.

According to the above-described configuration, since the force generation portion collides with the fluid blown out from the first inflow port and causes an assisting force in a direction matching the nozzle displacement direction toward the second inflow port, the displacement of the nozzle toward the second inflow port is assisted by the assisting force. Since the nozzle can be quickly displaced toward the second inflow port under the action of the assisting force, the servo-valve can quickly drive the actuator.

In the above-described confirmation, the force generation portion may be a cone which protrudes toward the inflow surface and grows narrower toward the inflow surface. The outer circumferential surface may include a first force generation surface that causes an assisting force for the displacement of the nozzle toward the first inflow port and a second force generation surface that causes an assisting force for the displacement of the nozzle toward the second inflow port.

According to the above-described configuration, since the outer circumferential surface of the cone includes the first force generation surface and the second force generation surface, the nozzle can have a simple structure for obtaining a first assisting force and a second assisting force.

In the above-described confirmation, the first force generation surface may face the second inflow port. The second force generation surface may face the first inflow port.

According to the above-described configuration, since the first force generation surface faces the second inflow port, the first force generation surface can strongly cause a first assisting force immediately after the nozzle is displaced from the neutral position toward the first inflow port. Since the second force generation surface faces the first inflow port, the second force generation surface can strongly cause a second assisting force immediately after the nozzle is displaced from the neutral position toward the second inflow port.

In the above-described confirmation, the nozzle may include a facing surface that faces the inflow surface. The facing surface may be formed within the first virtual plane. The cone may include a discharge end surface that is formed within a second virtual plane defined between the first virtual plane and the inflow surface and is provided with the discharge port. A first outline of the cone within the first virtual plane may be surrounded by an outer edge of the facing surface. A second outline of the cone within the second virtual plane may surround the discharge port.

According to the above-described configuration, since the first outline is surrounded by the outer edge of the facing surface and the second outline surrounds the discharge port, the outer circumferential surface is positioned between the outer edge of the facing surface and the discharge port. Thus, the force generation portion can collide with the fluid blown out from the first inflow port or the second inflow port and cause the first assisting force or the second assisting force.

In the above-described confirmation, the first outline may form a concave corner between the outer circumferential surface and the facing surface.

According to the above-described configuration, since the cone protrudes from the concave corner, the fluid blown out from the first inflow port or the second inflow port can flow toward the outer edge of the facing surface while not substantially staying at a certain position.

In the above-described confirmation, the nozzle may include a facing surface that faces the inflow surface. The facing surface may be formed within the first virtual plane. The first force generation surface and the second force generation surface may form a groove portion that is recessed from the first virtual plane.

According to the above-described configuration, since the first force generation surface and the second force generation surface form the groove portion that is recessed from the first virtual plane, the force generation portion may not protrude from the facing surface. Thus, the nozzle may have a short axial dimension.

In the above-described confirmation, the outer edge may be formed at a position separated from each of the first inflow port and the second inflow port in relation to a distance between the first inflow port and the second force generation surface and a distance between the second inflow port and the first force generation surface.

According to the above-described configuration, since the outer edge is formed at a position separated from each of the first inflow port and the second inflow port in relation to a distance between the first inflow port and the second force generation surface and a distance between the second inflow port and the first force generation surface, the flow of the fluid is stabilized between the facing surface and the inflow surface. As a result, a force generated from the flow of the fluid in the periphery of the outer edge of the facing surface hardly acts in a direction opposite to the nozzle displacement direction. Thus, the servo-valve can quickly drive the actuator.

In the above-described confirmation, the receiver may include a first flow path wall that forms a first flow path extended from the first inflow port and a second flow path wall that forms a second flow path extended from the second inflow port. The inflow surface may divide the fluid discharged from the discharge port into a first fluid flowing into the first inflow port and a second fluid flowing into the second inflow port. When the nozzle is displaced from the neutral position toward the first inflow port, the second fluid may be reflected by the second flow path wall toward the first force generation surface.

According to the above-described configuration, since the second fluid is reflected toward the first force generation surface by the second flow path wall when the nozzle is displaced from the neutral position toward the first inflow port, the displacement of the nozzle toward the first inflow port is assisted by the fluid reflected toward the second surface by the second flow path wall. Thus, the servo-valve can quickly drive the actuator.

In the above-described confirmation, when the nozzle is displaced from the neutral position toward the second inflow port, the first fluid may be reflected by the first flow path wall toward the second force generation surface.

According to the above-described configuration, since the first fluid is reflected by the first flow path wall toward the second force generation surface when the nozzle is displaced from the neutral position toward the second inflow port, the displacement of the nozzle toward the second inflow port is assisted by the fluid reflected by the first flow path wall toward the first surface. Thus, the servo-valve can quickly drive the actuator.

In the above-described confirmation, the servo-valve may further include a driving unit displacing the nozzle and a casing provided with a flow path through which the fluid flows. The casing may be provided with a first outflow port connected to the first inflow port and a second outflow port connected to the second inflow port. The driving unit may displace the nozzle between the first inflow port and the second inflow port to adjust the amount of the fluid flowing out of the first outflow port and the amount of the fluid flowing out of the second outflow port.

According to the above-described configuration, since the driving unit displaces the nozzle between the first inflow port and the second inflow port to adjust the amount of the fluid flowing out of the first outflow port and the amount of the fluid flowing out of the second outflow port, the designer can appropriately select an assisting force action direction with respect to the nozzle by changing the outflow amounts from the first outflow port and the second outflow port.

In the above-described confirmation, the servo-valve may further include a first movable piece that moves in a reciprocating manner inside the casing by the fluid in response to the displacement of the nozzle. When the nozzle is displaced toward the first inflow port, the first movable piece may be displaced by the fluid discharged to the first inflow port and extrude the fluid from the second outflow port to blow out the fluid from the second inflow port. When the nozzle is displaced toward the second inflow port, the first movable piece may be displaced by the fluid discharged to the second inflow port and extrude the fluid from the first outflow port to blow out the fluid from the first inflow port.

According to the above-described configuration, since the first movable piece is displaced by the fluid discharged from the first inflow port and blows out the fluid from the second inflow port, the displacement of the nozzle toward the first inflow port is assisted by the fluid blown out from the second inflow port. When the nozzle is displaced toward the second inflow port, the first movable piece is displaced by the fluid discharged to the second inflow port and blows out the fluid from the first inflow port, the displacement of the nozzle toward the second inflow port is assisted by the fluid blown out from the first inflow port.

A fluidic device according to another aspect of the invention includes the above-described servo-valve and an actuator that includes a second movable piece operated in response to the displacement of the first movable piece.

According to the above-described configuration, since the fluidic device includes the above-described servo-valve, the nozzle is highly responsively operated. As a result, the first movable piece can be also highly responsively displaced. Since the second movable piece of the actuator is operated in response to the displacement of the first movable piece, the second movable piece can be also highly responsively operated.

A fluidic device according to still another aspect of the invention includes the above-described servo-valve and an actuator that includes the casing and a movable piece dividing a hollow portion formed by the casing to form the flow path. When the nozzle is displaced toward the first inflow port, the movable piece is displaced by the fluid discharged to the first inflow port and extrudes the fluid from the second outflow port to blow out the fluid from the second inflow port. When the nozzle is displaced toward the second inflow port, the movable piece is displaced by the fluid discharged to the second inflow port and extrudes the fluid from the first outflow port to blow out the fluid from the first inflow port.

According to the above-described configuration, since the movable piece is displaced by the fluid discharged to the first inflow port and blows out the fluid from the second inflow port when the nozzle is displaced toward the first inflow port, the displacement of the nozzle toward the first inflow port is assisted by the fluid blown out from the second inflow port. Since the movable piece is displaced by the fluid discharged to the second inflow port and blows out the fluid from the first inflow port when the nozzle is displaced toward the second inflow port, the displacement of the nozzle toward the second inflow port is assisted by the fluid blown out from the first inflow port.

The principle of the above-described embodiments is suitably used for various devices for obtaining a driving force from a fluid.

What is claimed is:

1. A servo-valve for controlling a fluid discharged from a discharge port of a nozzle by displacing the nozzle and for driving an actuator, servo-valve comprising:
the nozzle;
a receiver that includes an inflow surface provided with a first inflow port and a second inflow port into which the fluid discharged from the discharge port flows,
a left flow path that extends from the first inflow port; and
a right flow path that extends from the second inflow port,
wherein the nozzle includes a force generation portion that includes an end surface provided with the discharge port and an outer circumferential surface formed in the periphery of the end surface,
wherein when the nozzle is displaced from a neutral position in which an extended line extended from a center of the discharge port intersects the inflow surface between the first inflow port and the second inflow port toward a position in which the extended line intersects the first inflow port, the fluid inside the second inflow port is blown out toward the nozzle,
wherein the fluid mainly flowing into the first inflow port is blown out from the second inflow port via the flow path,
wherein the left flow path and the right flow path are connected via a movable portion,
wherein the fluid mainly flowing into the first inflow port is supplied to the movable portion via the left flow path,
wherein the movable portion blows out the fluid inside the movable portion from the second inflow port by extruding the fluid to the right flow path, and
wherein the force generation portion collides with the fluid blown out from the second inflow port and causes an assisting force in a direction matching the nozzle displacement direction.

2. The servo-valve according to claim 1,
wherein the receiver includes a first flow path wall that forms a first flow path extended from the first inflow port and a second flow path wall that forms a second flow path extended from the second inflow port,
wherein the inflow surface divides the fluid discharged from the discharge port into a first fluid flowing into the first inflow port and a second fluid flowing into the second inflow port, and
wherein when the nozzle is displaced from the neutral position toward the first inflow port, the second fluid is reflected by the second flow path wall toward the first force generation surface.

3. The servo-valve according to claim 2,
wherein when the nozzle is displaced from the neutral position toward the second inflow port, the first fluid is reflected by the first flow path wall toward the second force generation surface.

4. A servo-valve that controls a fluid discharged from a discharge port of a nozzle by displacing the nozzle and drives an actuator, servo-valve comprising:
a nozzle and its discharge port;
a receiver that includes an inflow surface provided with a first inflow port and a second inflow port into which the fluid discharged from the discharge port flows,
wherein the nozzle includes a force generation portion that includes an end surface provided with the discharge port and an outer circumferential surface formed in the periphery of the end surface,
wherein when the nozzle is displaced from a neutral position in which an extended line extended from a center of the discharge port intersects the inflow surface between the first inflow port and the second inflow port toward a position in which the extended line intersects the first inflow port, the fluid inside the second inflow port is blown out toward the nozzle, and wherein the force generation portion collides with the fluid blown out from the second inflow port and causes an assisting force in a direction matching the nozzle displacement direction;

wherein the force generation portion is a cone which protrudes toward the inflow surface and grows narrower toward the inflow surface, wherein the outer circumferential surface includes a first force generation surface that causes an assisting force for the displacement of the nozzle toward the first inflow port and a second force generation surface that causes an assisting force for the displacement of the nozzle toward the second inflow port;

wherein the nozzle includes a facing surface that faces the inflow surface, wherein the facing surface is formed within the first virtual plane, and wherein the first force generation surface and the second force generation surface form a groove portion that is recessed from the first virtual plane.

5. The servo-valve according to claim 4, wherein when the nozzle is displaced from the neutral position toward a position in which the extended line intersects the second inflow port, the fluid inside the first inflow port is blown out toward the nozzle, and wherein the force generation portion collides with the fluid blown out from the first inflow port and causes an assisting force in a direction matching the nozzle displacement direction.

6. The servo-valve according to claim 5, further comprising:

a driving unit that displaces the nozzle; and a casing that is provided with a flow path through which the fluid flows, wherein the casing is provided with a first outflow port connected to the first inflow port and a second outflow port connected to the second inflow port, and wherein the driving unit displaces the nozzle between the first inflow port and the second inflow port to adjust the amount of the fluid flowing out of the first outflow port and the amount of the fluid flowing out of the second outflow port.

7. The servo-valve according to claim 6, further comprising:

a first movable piece that moves in a reciprocating manner inside the casing by the fluid in response to the displacement of the nozzle, wherein when the nozzle is displaced toward the first inflow port, the first movable piece is displaced by the fluid discharged to the first inflow port and extrudes the fluid from the second outflow port to blow out the fluid from the second inflow port, and wherein when the nozzle is displaced toward the second inflow port, the first movable piece is displaced by the fluid discharged to the second inflow port and extrudes the fluid from the first outflow port to blow out the fluid from the first inflow port.

8. A fluidic device comprising:

the servo-valve according to claim 7; and an actuator that includes a second movable piece operated in response to the displacement of the first movable piece.

9. A fluidic device comprising:

the servo-valve according to claim 6;

an actuator that includes the casing and a movable piece dividing a hollow portion formed by the casing to form the flow path, wherein when the nozzle is displaced toward the first inflow port, the movable piece is displaced by the fluid discharged to the first inflow port and extrudes the fluid from the second outflow port to blow out the fluid from the second inflow port, and wherein when the nozzle is displaced toward the second inflow port, the movable piece is displaced by the fluid discharged to the second inflow port and extrudes the fluid from the first outflow port to blow out the fluid from the first inflow port.

10. The servo-valve according to claim 4, wherein the first force generation surface faces the second inflow port, and wherein the second force generation surface faces the first inflow port.

11. The servo-valve according to claim 4, wherein the nozzle includes a facing surface that faces the inflow surface, wherein the facing surface is formed within the first virtual plane, wherein the cone includes a discharge end surface that is formed within a second virtual plane defined between the first virtual plane and the inflow surface and is provided with the discharge port, wherein a first outline of the cone within the first virtual plane is surrounded by an outer edge of the facing surface, and wherein a second outline of the cone within the second virtual plane surrounds the discharge port.

12. The servo-valve according to claim 11, wherein the first outline forms a concave corner between the outer circumferential surface and the facing surface.

13. The servo-valve according to claim 11, wherein the outer edge is formed at a position separated from each of the first inflow port and the second inflow port in relation to a distance between the first inflow port and the second force generation surface and a distance between the second inflow port and the first force generation surface.

* * * * *